(12) United States Patent
Ghercioiu et al.

(10) Patent No.: US 7,340,737 B2
(45) Date of Patent: Mar. 4, 2008

(54) WIRELESS DEPLOYMENT / DISTRIBUTED EXECUTION OF GRAPHICAL PROGRAMS TO SMART SENSORS

(75) Inventors: Marius Ghercioiu, Austin, TX (US);
Ciprian Ceteras, Baia Mare (RO);
Ioan Monoses, Gherla jud Cluj (RO);
Gratian I. Crisan, jud Cluj (RO);
Jeffrey L. Kodosky, Austin, TX (US)

(73) Assignee: National Instruments Corporation, Austin, TX (US)

( * ) Notice: Subject to any disclaimer, the term of this patent is extended or adjusted under 35 U.S.C. 154(b) by 717 days.

(21) Appl. No.: 10/283,758

(22) Filed: Oct. 30, 2002

(65) Prior Publication Data

US 2004/0005859 A1 Jan. 8, 2004

Related U.S. Application Data

(60) Provisional application No. 60/393,528, filed on Jul. 3, 2002.

(51) Int. Cl.
*G06F 9/44* (2006.01)
*G06F 15/67* (2006.01)
*G06F 15/173* (2006.01)

(52) U.S. Cl. .................... 717/171; 717/169; 709/216; 709/218; 709/242

(58) Field of Classification Search ......... 717/100–114

See application file for complete search history.

(56) References Cited

U.S. PATENT DOCUMENTS 4,901,221 A 2/1990 Kodosky et al. ............ 715/771

(Continued)

FOREIGN PATENT DOCUMENTS

EP 1077404 2/2001
WO WO01/14963 3/2001

OTHER PUBLICATIONS

SOFTWIRE, "Graphical Programming for Visual Basic", 2000, 43 pages.

(Continued)

*Primary Examiner*—Tuan Dam
*Assistant Examiner*—Chuck Kendall
(74) *Attorney, Agent, or Firm*—Meyertons Hood Kivlin Kowert & Goetzel, P.C.; Jeffrey C. Hood; Mark S. Williams

(57) ABSTRACT

System and method for deploying or executing a graphical program to a device in a wireless manner. A graphical program (GP) is created that implements a measurement function. Some or all of the GP is transmitted to a hub over a network. The hub executes the transmitted GP and sends corresponding commands to a measurement device via wireless means in accordance with a wireless communication protocol. The measurement device executes the commands to perform the measurement function, thereby generating resultant data, which is received from the measurement device via wireless means. The GP may include a block diagram that executes on the measurement device, and a user interface portion that is displayed by a first computer system. Transmitting the GP to the hub may include generating a machine-executable program based on the GP and transmitting the machine-executable program to the hub for execution.

30 Claims, 19 Drawing Sheets

U.S. PATENT DOCUMENTS

| | | | | |
|---|---|---|---|---|
| 5,481,741 | A | 1/1996 | McKaskle et al. | 345/522 |
| 5,838,683 | A | 11/1998 | Corley et al. | 370/408 |
| 5,920,479 | A | 7/1999 | Sojoodi et al. | 700/86 |
| 5,973,693 | A * | 10/1999 | Light | 715/835 |
| 6,102,965 | A | 8/2000 | Dye et al. | 717/109 |
| 6,173,438 | B1 | 1/2001 | Kodosky et al. | 717/109 |
| 6,751,653 | B2 | 6/2004 | Austin | 709/217 |
| 6,802,053 | B1 | 10/2004 | Dye et al. | 717/113 |
| 6,823,283 | B2 | 11/2004 | Steger et al. | 702/127 |
| 2002/0055947 | A1 | 5/2002 | Schultz et al. | 715/550 |
| 2002/0186245 | A1 * | 12/2002 | Chandhoke et al. | 345/764 |
| 2003/0035004 | A1 * | 2/2003 | Dove et al. | 345/762 |
| 2004/0004637 | A1 * | 1/2004 | Ghercioiu et al. | 345/771 |
| 2004/0005859 | A1 * | 1/2004 | Ghercioiu et al. | 455/3.01 |

OTHER PUBLICATIONS

Jan Jaros and Radimir Vrba, "Bluetooth Technology for Smart Sensor Implementation", ElectronicsLetters.com, 8 pgs. Nov. 15, 2001.

PCT/US03/21352 Search Report, mailed Dec. 17, 2004.

"BridgeVIEW and LabVIEW Internet Developers Toolkit for G Reference Manual" Part No. 321392B-01, Jun. 1998.

Jiang et al., "Wireless Telemetry and Command (T&C) Program", NMSU-ECE-00-003, Apr. 5, 2000.

"Quatech Releases Wireless Data Acquisition Systems", http://www.freedomusb.com/press/qtm8524.php Aug. 16, 2000.

"LabVIEW Messaging by Means of Public Communication", GSM SMS Toolkit for LabVIEW, (1 page), Oct. 30, 2002.

"General Purpose Wireless Data Acquisition System", Mastery Instruments, Inc., Model WAU 80/160 (2 pages), Oct. 30, 2002.

"Building Intelligent Ethernet-Based Distributed I/O Systems with National Instruments LabVIEW" http://sine.ni.com/apps/we/nioc (7 pages), Oct. 30, 2002.

Build a Bluetooth Enabled PDA Digital Multimeter with LabVIEW PDA, National Instruments, May 12, 2004, (4 pages), Oct. 30, 2002.

Quinn et al., "Wireless Palm Pilot Connection for LabVIEW", SES Technology Integration, (3 pages), Oct. 30, 2002.

* cited by examiner

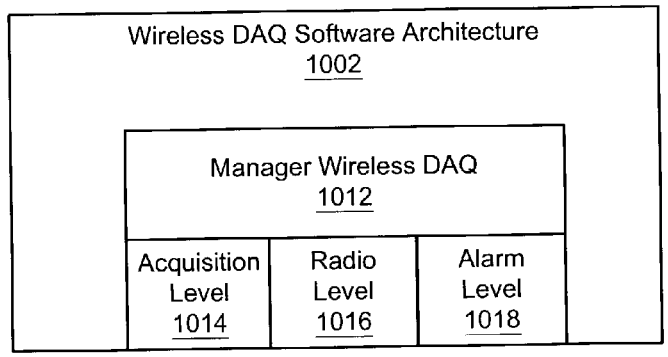

Figure 10A

| Start Byte 1022 | Destination Address 1023 | Source Address 1024 | Command & Channel 1025 | Checksum 1026 | Payload 1027 | Stop Byte 1028 |

Figure 10B

| name | description | length |
|---|---|---|
| Start byte | Reserved byte that marks the beginning of a packet | 1 byte |
| Destination address | Destination device (that receives the packet) address | 2 bytes |
| Source address | Sender device (that sends the packet) address | 2 bytes |
| Command & Channel | Fields: | 2 bytes |
| | Frag - 1 bit, if part of a larger fragment | 1 bit |
| | Seqn - 1 bit, sequence number | 1 bit |
| | Command - 3 bits, command (read, write, error etc.) | 3 bits |
| | Channel - 3 bits, channel number | 3 bits |
| Checksum | Control sum for the heder | 1 byte |
| Payload | Data the is sent or received | max. 64 bytes |
| Stop byte | Rezerved byte that marks the end of the package | 1 byte |

Figure 10C

WIRELESS DEPLOYMENT / DISTRIBUTED EXECUTION OF GRAPHICAL PROGRAMS TO SMART SENSORS

PRIORITY INFORMATION

This application claims benefit of priority of U.S. Provisional Patent Application Ser. No. 60/393,528 titled "Wireless Deployment/Distributed Execution of Graphical Programs to Smart Sensors", filed Jul. 3, 2002, whose inventors were Marius Ghercioiu, Ciprian Ceteras, Ioan Monoses, Crisan Gratian, and Jeffrey L. Kodosky.

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

FIELD OF THE INVENTION

The present invention relates to the field of graphical programming, and more particularly to a system and method for enabling wireless transmission of a graphical program to a sensor or data acquisition device.

DESCRIPTION OF THE RELATED ART

Traditionally, high level text-based programming languages have been used by programmers in writing application programs. Many different high level programming languages exist, including BASIC, C, Java, FORTRAN, Pascal, COBOL, ADA, APL, etc. Programs written in these high level languages are translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, Basic, Java, etc.

The method disclosed in Kodosky et al allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

Therefore, Kodosky et al teaches a graphical programming environment wherein a user places or manipulates icons and interconnects or "wires up" the icons in a block diagram using a block diagram editor to create a graphical "program." A graphical program for performing an instrumentation, measurement or automation function, such as measuring a Unit Under Test (UUT) or device, controlling or modeling instruments, controlling or measuring a system or process, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation, and numerical analysis, as well as for any type of general programming.

A graphical program may have a graphical user interface. For example, in creating a graphical program, a user may create or specify a front panel or user interface panel. The front panel may include various graphical user interface elements or front panel objects, such as user interface controls and/or indicators, that represent or display the respective input and output that will be used by the graphical program or VI, and may include other icons which represent devices being controlled. The front panel may be comprised in a single window of user interface elements, or may comprise a plurality of individual windows each having one or more user interface elements, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel may comprise front panel objects, e.g., the GUI, embedded in the block diagram.

During creation of the block diagram portion of the graphical program, the user may select various function nodes or icons that accomplish his desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program, referred to as a block diagram, graphically representing the desired process. The assembled graphical program may be represented in the memory of the computer system as data structures and/or program instructions. The assembled graphical program, e.g., these data structures or program instructions, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using a graphical user interface, e.g., a front panel as described above. The input data may propagate through the block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the user interface may be used merely to view the input and output, or just the output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, image processing/machine vision applications, and motion control, among others.

In parallel with the development of the graphical programming model, measurement and control systems have been developed for a wide variety of applications, such as automated manufacturing and remote data collection, among others. It would be desirable to provide an improved method for distributing and/or deploying graphical programs to various devices.

SUMMARY OF THE INVENTION

One embodiment of the present invention comprises a system and method for distributing, executing, and/or deploying a graphical program to one or more devices in a wireless fashion. First, a graphical program may be created that implements a measurement function, e.g., an industrial automation function, a process control function, and/or a test and measurement function. For example, creating the graphical program may include arranging a plurality of nodes on a display, and interconnecting the plurality of nodes in response to user input. In one embodiment, the graphical program may comprise a graphical data flow program.

At least a portion of a graphical program may be transmitted to a hub device over a network. The hub device may execute the transmitted portion of the graphical program and, in response to said executing, may send one or more commands to a measurement device (e.g., a sensor) via wireless means in accordance with a wireless communication protocol. The measurement device may then perform the measurement function in response to the one or more commands, and generate resultant data. For example, performing the measurement function may include the measurement device measuring a physical phenomenon to acquire data. Finally, the resultant data may be received from the measurement device via wireless means. In one embodiment, receiving the resultant data from the measurement device via wireless means may include the measurement device sending the resultant data to the hub device via wireless means; and (the computer system or another system) receiving the resultant data from the hub device.

In one embodiment, the graphical program may include a plurality of interconnected nodes that visually indicate functionality of the graphical program. The graphical program may include a block diagram portion and a user interface portion. During execution of the graphical program, the user interface may be displayed on a display of a first computer system and the block diagram may execute on the hub device.

In one embodiment, the hub device may store and execute a graphical program execution engine to execute the transmitted graphical program. In another embodiment, transmitting at least a portion of a graphical program to the hub device may include generating a machine-executable program (e.g., C code, assembly code, etc.) based on the graphical program, and transmitting the machine-executable program to the hub device. In this embodiment, the hub device executing the at least a portion of the graphical program may include the hub device executing the machine-executable program. Thus, a machine-executable program representing (at least a portion of) the graphical program may be transmitted to the hub device for execution. The hub device may execute the machine-executable program and send corresponding commands to the measurement device/sensor. The measurement device/sensor may execute the commands (or perform functions based on the commands) and generate the resultant data. The data may then be sent to the hub device, the computer system, and/or an external system, for analysis and/or storage.

Thus, various embodiments of the present invention may provide means for performing a measurement function by deploying or executing a graphical program to a measurement device using wireless means.

BRIEF DESCRIPTION OF THE DRAWINGS

A better understanding of the present invention can be obtained when the following detailed description of the preferred embodiment is considered in conjunction with the following drawings, in which:

FIG. 10A illustrates wireless DAQ device software architecture, according to one embodiment;

FIGS. 10B-10C illustrate a radio communication data packet structure, according to one embodiment;

Figure 1A:
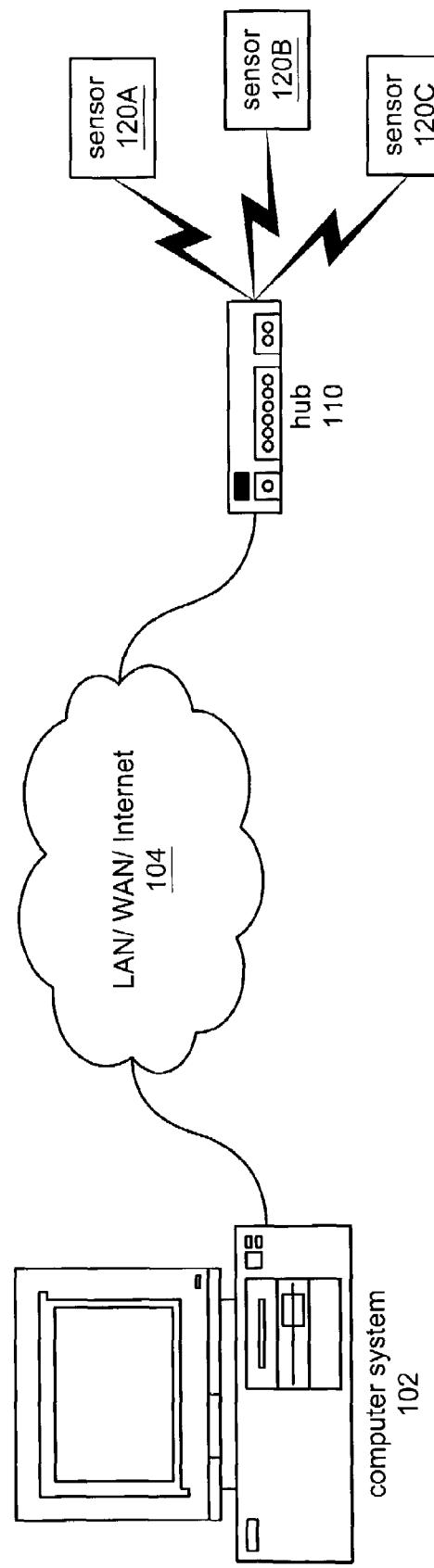
FIGS. 1A-1C illustrate various embodiments of a system for performing data acquisition using wireless means.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Provisional Patent Application Ser. No. 393,528 titled "Wireless Deployment/Distributed Execution of Graphical Programs to Smart Sensors", filed Jul. 3, 2002;

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. patent application Ser. No. 09/617,600 titled "Graphical Programming System with Distributed Block Diagram Execution and Front Panel Display," filed Jun. 13, 2000.

U.S. patent application Ser. No. 09/518,492 titled "System and Method for Programmatically Creating a Graphical Program," filed Mar. 3, 2000.

U.S. patent application Ser. No. 09/745,023 titled "System and Method for Programmatically Generating a Graphical Program in Response to Program Information," filed Dec. 20, 2000.

The LabVIEW and BridgeVIEW graphical programming manuals, including the "G Programming Reference Manual", available from National Instruments Corporation, are also hereby incorporated by reference in their entirety.

An Appendix containing the following program files and images, copyright 2001, National Instruments Corporation, is submitted herewith on a compact disc (with a duplicate compact disc containing same), which program files and images are hereby incorporated by reference in their entirety.

Each of the two submitted compact discs includes:

| Name | Size | Modified |
| --- | --- | --- |
| Build HUB list__(01).bmp | 6,090 KB | Sep. 5, 2002 |
| Build HUB list__(02).bmp | 6,079 KB | Sep. 5, 2002 |
| Build_crc.32.bmp | 6,113 KB | Sep. 5, 2002 |
| Change Name UI__(01).bmp | 6,092 KB | Sep. 5, 2002 |
| Change Name UI__(02).bmp | 6,087 KB | Sep. 5, 2002 |
| Change Name UI__(03).bmp | 6,077 KB | Sep. 5, 2002 |
| Change Name UI__(04).bmp | 6,097 KB | Sep. 5, 2002 |
| Change Name UI__(05).bmp | 6,087 KB | Sep. 5, 2002 |
| change_Name.bmp | 6,124 KB | Sep. 5, 2002 |
| change_net_config_UI__(01).bmp | 6,068 KB | Sep. 5, 2002 |
| change_net_config_UI__(02).bmp | 6,057 KB | Sep. 5, 2002 |
| cluster to net.bmp | 6,057 KB | Sep. 5, 2002 |
| crc32.bmp | 6,101 KB | Sep. 5, 2002 |
| daq_info.bmp | 6,090 KB | Sep. 5, 2002 |
| dac_list.bmp | 6,079 KB | Sep. 5, 2002 |
| Decode DISCOVERY_REPLY__(01).bmp | 6,079 KB | Sep. 5, 2002 |
| Decode DISCOVERY_REPLY__(02).bmp | 6,124 KB | Sep. 5, 2002 |
| Detect.bmp | 6,101 KB | Sep. 5, 2002 |
| discovery_reply_check.bmp | 6,113 KB | Sep. 5, 2002 |
| fix_name.bmp | 6,101 KB | Sep. 5, 2002 |
| Global var.bmp | 6,101 KB | Sep. 5, 2002 |
| Main Config 4__(01).bmp | 6,107 KB | Sep. 5, 2002 |

-continued

| Name | Size | Modified |
| --- | --- | --- |
| Main Config 4_(02).bmp | 6,112 KB | Sep. 5, 2002 |
| Main Config 4_(03).bmp | 6,092 KB | Sep. 5, 2002 |
| Main Config 4_(04).bmp | 6,067 KB | Sep. 5, 2002 |
| Main Config 4_(05).bmp | 6,097 KB | Sep. 5, 2002 |
| Main Config 4_(06).bmp | 6,087 KB | Sep. 5, 2002 |
| net to cluster.bmp | 6,090 KB | Sep. 5, 2002 |
| net_conf_(01).bmp | 6,068 KB | Sep. 5, 2002 |
| net_conf_(02).bmp | 6,068 KB | Sep. 5, 2002 |
| net_info.bmp | 6,124 KB | Sep. 5, 2002 |
| New Name Dialog.bmp | 6,101 KB | Sep. 5, 2002 |
| store_net_info_(01).bmp | 6,101 KB | Sep. 5, 2002 |
| store_net_info_(02).bmp | 6,113 KB | Sep. 5, 2002 |
| Configurator.llb | 666 KB | Jul. 17, 2002 |
| demo-new.arm.llb | 619 KB | Jul. 17, 2002 |

Figure 1B:
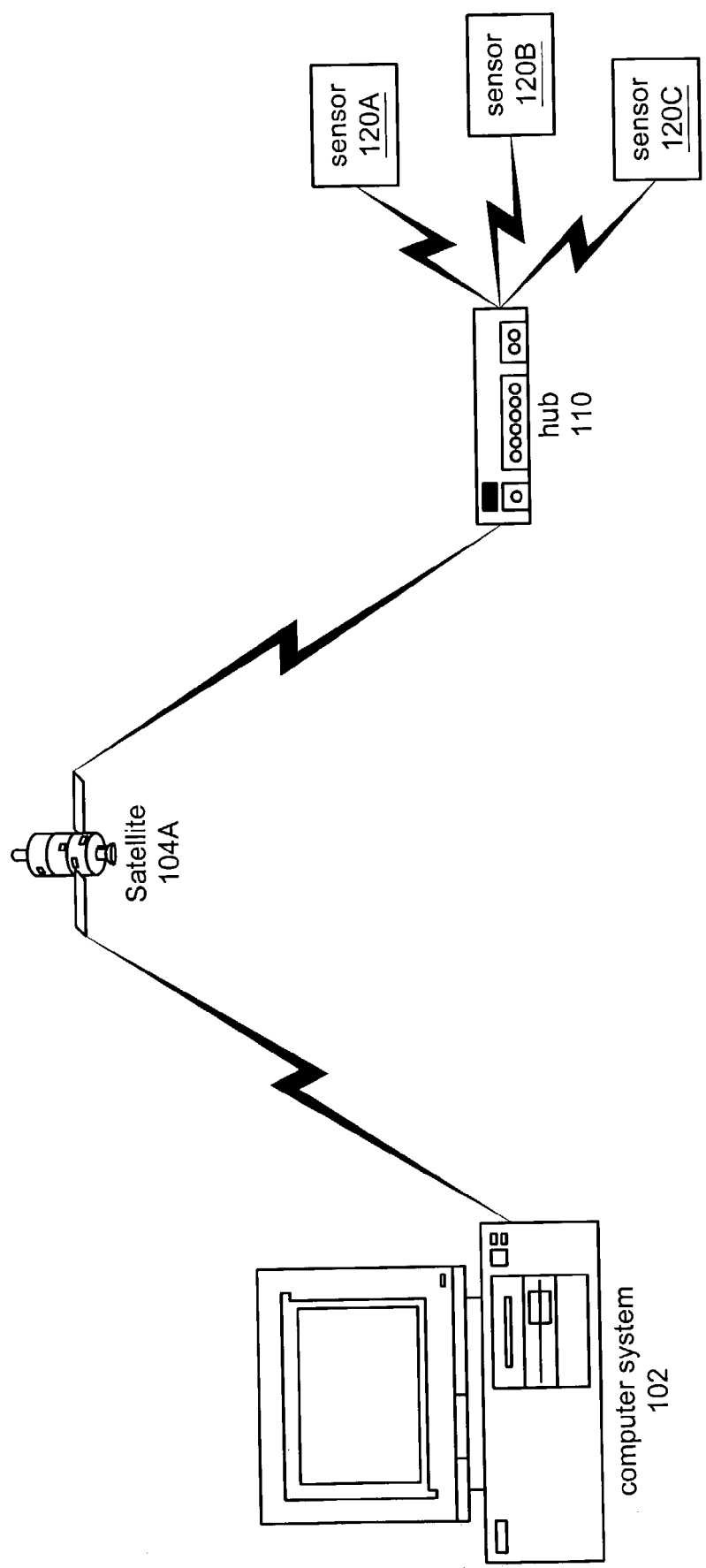
Figure 1C:
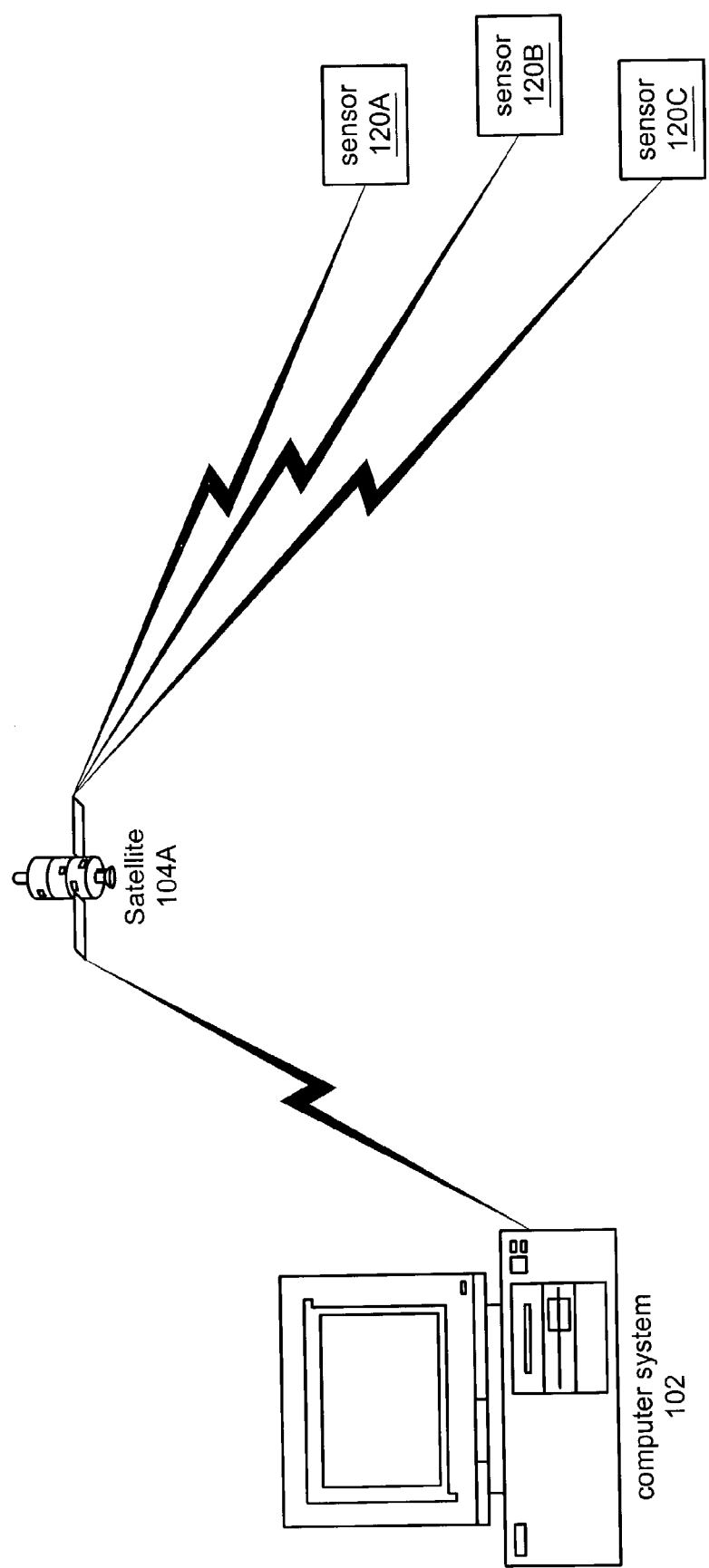

FIGS. 1A-1C—Data Acquisition Systems

FIGS. 1A-1C illustrate various embodiments of a system for data acquisition. As shown in FIG. 1A, the system may include a computer system 102 coupled through a network 104 to a hub device 110, also referred to as a target device 110. In FIG. 1B, an embodiment is shown where the computer system 102 is coupled to the hub device 110 via wireless means, e.g., via satellite. Other wireless communication means are also contemplated, such as, for example, communication via cell towers, such as used for cellular telephone communication, among others.

As FIGS. 1A and 1B show, the hub device 110 may, in turn, be in wireless communication with one or more smart sensors or data acquisition devices 120. As will be described in more detail below, the sensors 120 may each be operable to receive commands from the hub device 110, to execute one or more functions in response to the commands, e.g., to acquire data, and to send acquired data back to the hub device 110. In another embodiment, shown in FIG. 1C, the computer system 102 may communicate directly with the one or more smart sensors/DAQ devices 120 via wireless means, e.g., via satellite, cell towers, etc. In other words, the hub device 110 may be omitted. In this embodiment, the smart sensors 120 themselves are the target devices.

The computer system 102 may be any of various types of computer systems. Computer system 102 may include a processor, a memory medium, as well as other components as may typically be found in a computer system. The memory medium of the computer system may store a program development environment for creating programs. The computer system 102 is described in more detail below with reference to FIG. 3. As used herein, the term "program" is intended to include text-based or graphical instructions which are executable, compilable, and/or interpretable by a processor to perform a specified function or functions. The term "program" is also intended to include a hardware configuration program, e.g., a program for configuring a programmable hardware element such as an FPGA.

In one embodiment, the program development environment is a graphical program development environment for creating graphical programs. An exemplary graphical program development environment is the LabVIEW development environment offered by National Instruments Corporation. Other exemplary graphical program development environments include Simulink from The MathWorks, and VEE from Agilent, among numerous others.

A user may create a program on a computer system, and computer system 102 may provide the program to hub device 110 either for execution on hub device 110 or for possible deployment to data acquisition devices 120.

Hub device 110 may include a processor and memory medium for executing programs, such as graphical programs. In one embodiment, hub device 110 executes programs received from the computer system. Execution of the program causes hub device 110 to communicate with one or more of the sensors or data acquisition devices 120. In response to the hub device 110 executing a received program, the hub device 110 may direct the sensors or data acquisition devices 120 to acquire data (e.g., from an external phenomenon, such as the "real world") and provide the acquired data to the hub device 110 (or provide the acquired data to another device). The hub device 110 may also direct the sensors or data acquisition devices 120 to generate a stimulus signal as part of its operation.

In another embodiment, the hub device 110 operates to deploy the programs to one or more of data acquisition devices 120 in a wireless fashion, and the program executes on data acquisition device 120. In yet another embodiment, a portion of the program executes on hub device 110, and another portion of the program is deployed onto one or more of data acquisition devices 120 for execution. It should be noted that in various embodiments, the hub 110 may be implemented in different devices, such as, for example, a device with an ARM processor, as described below, a PC (personal computer), a PXI chassis which includes a "PC on a card", or any other processor based device. The hub device 110 is preferably a small footprint device for reduced cost. The hub device 110 may also have a ruggedized form factor for surviving in harsh environmental conditions.

Hub device 110 may be connected to computer system 102 by a network 104 as shown. The network may be comprised of any of the various types of networks including local area networks, wide area networks, etc. One example of a wide area network is the Internet. Hub device 110 may also connect to computer system 102 through other communication mediums, such as a serial bus, e.g., USB or IEEE 1394, a parallel bus, or through wireless means. Hub device 110 may also connect to computer system 102 through a wireless mechanism, such as IEEE 802.11 (wireless Ethernet), satellite, and cellular towers, among others. Various combinations of the above wired and/or wireless networks may also be used.

Hub device 110 communicates with each of the one or more sensors 120 preferably in a wireless manner. The wireless communication mechanism may comprise any of various types of wireless transmission, including Blue Tooth, IEEE 802.11 (wireless Ethernet), RF communication, and other types of wireless communications. Further descriptions of various embodiments of the hub device 110 are provided below.

In one embodiment, the sensor devices 120 each comprise components for acquiring data from an external phenomenon. Each sensor device 120 may also include a small amount of processing capability, such as a micro-controller or processor. As mentioned above, in one embodiment, each sensor 120 includes sufficient processing power for receiving instructions from hub device 110 (or the computer system 102) to perform simple data acquisition commands, and to provide resulting data to hub device 110 (or computer system 102) in a wireless fashion. In another embodiment, each sensor device 120 includes a processor and memory medium for executing programs that have been deployed onto sensor device 120 (e.g., received by the hub device 110 from the computer system and which have been deployed onto sensor device 120). Further descriptions of various embodiments of the sensor device 120 are provided below. Each sensor device 120 is preferably a small footprint device for reduced power requirements. Each sensor device 120 may also have a ruggedized form factor for surviving in harsh environmental conditions.

Figure 2:
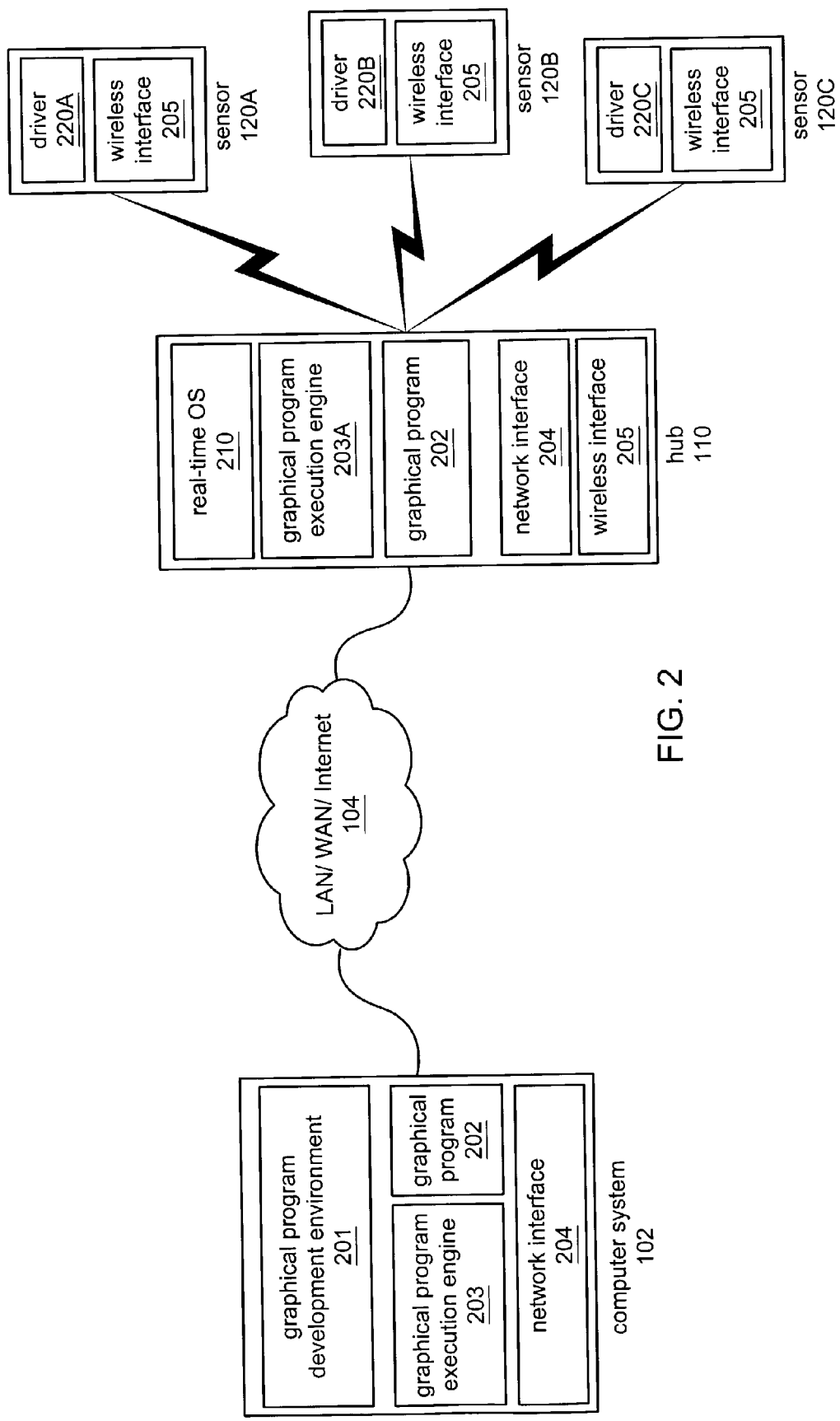
FIG. 2 is a block diagram of the system of FIG. 1A, according to one embodiment.

FIG. 2—Block Diagram of the Data Acquisition System

FIG. 2 is a block diagram of the system of FIG. 1A, according to one embodiment. In the embodiment shown in FIG. 2, the computer system 102 includes a graphical program development environment 201. The graphical program development environment 201 facilitates development of graphical programs for implementing desired functions or operations. The computer system 102 may also include a graphical program execution engine 203, henceforth referred to as the execution engine 203, which may be operable to execute graphical programs developed with the graphical program development environment 201 (or other graphical program development environments). As will be described in more detail below, the execution engine 203 may be stored on the computer system for transfer to an external device, e.g., the hub device 110. In other words, the execution engine 203 may be operable to be transferred entirely or in part to an external system to facilitate execution of graphical programs on the external device. In another embodiment, the execution engine 203 may already be installed on the hub device 110, obviating the need to transfer the engine 203 to the hub device. In one embodiment, the execution engine may comprise a graphical program execution engine virtual machine. In another embodiment, the graphical program may be converted into a format that is directly executable by an operating system without requiring an execution engine 203 deployed on either the hub device 110 or smart sensor 120.

As FIG. 2 also shows, the computer system 102 may also store one or more graphical programs 202 which are executable via the execution engine 203 (or portions thereof) to perform specified functions or operations, as desired. In the embodiment shown, the graphical program 202 may be stored for transferal to an external system for execution, such as the hub device 110. The computer system 102 may also include a network interface 204 for communicating over the network 104 With devices on the network 104. For example, the network interface 204 may be an Ethernet interface for communicating over the Internet 104. Further details of the computer system 102 are provided below with reference to FIG. 3. Although not shown in FIG. 2, in one embodiment the computer system 102 may include or be coupled to a wireless communication device for communicating in a wireless fashion with the hub device 110 and/or smart sensors 120.

In the embodiment of FIG. 2, the hub device 110 includes an operating system 210, preferably a real-time operating system (OS), for managing program execution, managing device resources, and communications, as is well known in the art. Examples of real-time operating systems 210 include, but are not limited to, Linux, NetBSD, vxWorks, eCos, and Windows CE. The embodiments of the invention described herein use the Linux OS, for such reasons as better support for embedded use, e.g., compressed flash file system, small C libraries, and utilities, and inexpensive licensing (e.g., free). The hub device 110 may also include execution engine 203A, which may include all or part of the execution engine 203 mentioned above. The execution engine 203A may facilitate execution of graphical program(s) 202 by the hub device 110. The graphical program(s) 202, shown stored on the hub device 110, may be received from the computer system 102 over the network 104 via network interface 204, also included on the hub device 110.

As FIG. 2 also shows, in one embodiment, the hub device 110 may include a wireless interface 205 for communicating with the one or more sensors (wireless DAQ devices) 120. In other words, the hub device 110 may include various drivers and circuitry which facilitate wireless communication with the sensors 120 according to respective wireless communication protocols. Examples of wireless communication protocols include Bluetooth and 802.11 (Wireless Ethernet).

Finally, as shown in FIG. 2, in one embodiment, each wireless sensor (DAQ device) 120 may include a wireless interface 205 for communicating with the hub device (or for communicating with the computer system 102). Additionally, each sensor 120 may include a driver 220 which may be executable by a processor (or micro-controller) on the sensor 120 to perform various functions. For example, in one embodiment, a sensor 120 may include camera functionality, where the driver may be executable to perform image acquisition functions. As another example, a sensor 120 may include equipment for measuring physical phenomenon in a plant, such as chemical plant, manufacturing plant, etc. As another example, a sensor 120 may include equipment for detecting the presence of physical substances, such as pollution, chemicals, fuel spills, bacteria, radiation, pesticides, herbicides, illegal substances, etc. As yet another example, a collection of sensors may be deployed in a vehicle, such as a commercial airline, car, bus, etc., and may be used to monitor operations/status of the vehicle. Of course, many other fields of application are also contemplated, including, but not limited to, robotics, manufacturing, control, machine vision, security, health/medicine, and scientific applications, among others. The driver program on the sensor may manage operation of the equipment, and may perform triggering and/or analysis based on the results of the detection. In other words, the driver for each sensor or DAQ device 120 may provide functionality specific to that device.

Figure 3:
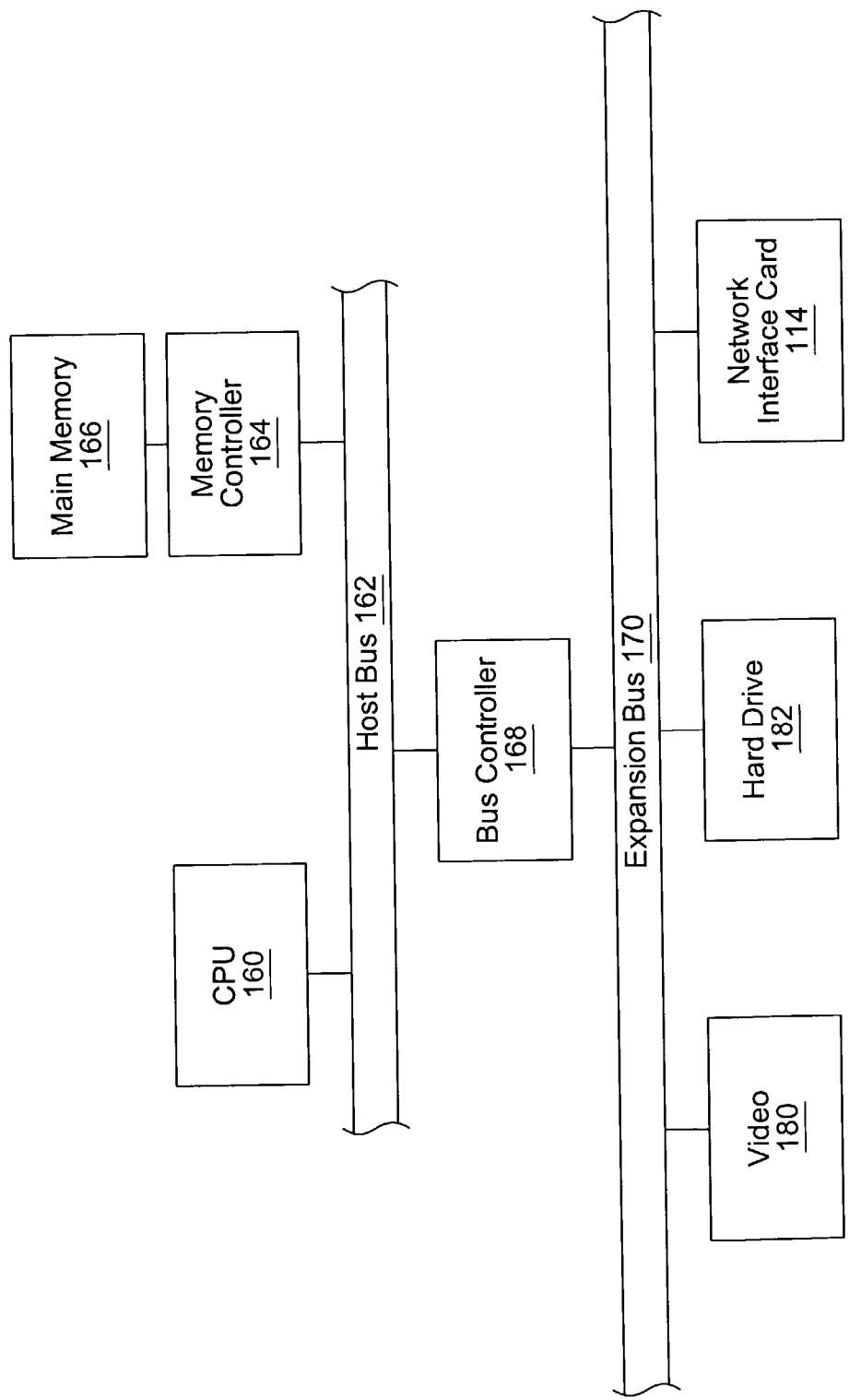
FIG. 3 is a block diagram of the computer system of FIGS. 1A-1C, and FIG. 2, according to one embodiment.

FIG. 3—Computer System Block Diagram

FIG. 3 is a block diagram for a computer system 102 suitable for implementing various embodiments of the present invention. More specifically, the computer system 102 may be operable to store and download to the hub device 110 a program (such as a graphical program) that is configured to perform a specified function. Embodiments of a method for transmitting and executing the graphical program are described below. The computer system 102 may be any type of computer system, including a personal computer system, mainframe computer system, workstation, network appliance, Internet appliance, personal digital assistant (PDA), television system or other device. In general, the term "computer system" can be broadly defined to encompass any device having at least one processor that executes instructions from a memory medium. The computer may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others.

The computer system 102 may include a memory medium(s) 166 on which one or more computer programs or software components according to one embodiment of the present invention may be stored. For example, the memory medium may store a graphical program execution engine, as well as one or more graphical programs, as described above.

Also, the memory medium may store a graphical programming development environment application used to create and/or execute such graphical programs. The memory medium may also store operating system software, network communication software, as well as other software for operation of the computer system.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

As FIG. 3 shows, the memory medium 166 may be coupled to the host bus 162 by means of memory controller 164. The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices, such as a network interface card 114, a video display subsystem 180, and hard drive 1102 coupled to the expansion bus 170.

In the present application, the term "graphical program" or "block diagram" is intended to include a program comprising graphical code, e.g., two or more interconnected nodes or icons, wherein the interconnected nodes or icons may visually indicate the functionality of the program. The nodes may be connected in one or more of a data flow, control flow, and/or execution flow format. The nodes may also be connected in a "signal flow" format, which is a subset of data flow. Thus the terms "graphical program" or "block diagram" are each intended to include a program comprising a plurality of interconnected nodes or icons which visually indicate the functionality of the program.

A graphical program may also comprise a user interface or front panel. The user interface portion may be contained in the block diagram or may be contained in one or more separate panels or windows. The user interface of a graphical program may include various graphical user interface elements or front panel objects, such as user interface controls and/or indicators, that represent or display the respective input and/or output that will be used by the graphical program or VI, and may include other icons which represent devices being controlled. The user interface or front panel may be comprised in a single window of user interface elements, or may comprise a plurality of individual windows each having one or more user interface elements, wherein the individual windows may optionally be tiled together. As another example, the user interface or front panel may comprise user interface or front panel objects, e.g., the GUI, embedded in the block diagram. The user interface of a graphical program may display only output, only input, or both input and output. Further, in some embodiments the user interface may operate as a front panel whereby the user may interactively control or manipulate the input being provided to the graphical program during execution of the graphical program.

Examples of graphical programming development environments that may be used to create graphical programs include LabVIEW, DasyLab, and DiaDem from National Instruments, VEE from Agilent, WiT from Coreco, Vision Program Manager from PPT Vision, SoftWIRE from Measurement Computing, Simulink from the MathWorks, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others. In the preferred embodiment, the system uses the LabVIEW graphical programming system available from National Instruments.

Embedded Devices

In various embodiments of the present invention, the hub device 110 coupled to the host computer 102 may be an embedded device 110. In various embodiments, the smart sensors 120 may be embedded devices. As used herein, the term "embedded device" refers to a small platform which includes dedicated hardware, and which includes a processor and memory (or FPGA) on which may be installed dedicated programs or software. An embedded device is typically designed to perform a defined task very well. In particular, an embedded device is typically not a device with general capabilities, such as a PC or PXI controller, for example, loaded with one or several plug-in boards, running a Microsoft OS with generous amounts of memory, system files, utilities, etc, that can be used as a measurement system, or as an office computer, or as a Web browser, etc. An example of an embedded system is an Internet remote camera, with dedicated hardware and software that implements the following tasks:

it acquires images from the optical device, it compresses these images as GIF or JPEG files, or perhaps as MPEG streams, and it sends the images to a host computer upon request, using TCP/IP, HTTP, or multimedia streams.

Other examples of embedded devices include a measurement device with a specific type of measurement hardware and/or software for taking certain measurements, a control measurement device with a specific type of hardware and/or software for performing certain control operations, etc.

The end user does not care about how these tasks are implemented, but only wants a device that sends real-time images over the Internet. Embedded systems are often used as building blocks for more complicated applications. Thus, an embedded device generally includes both hardware and software. Additionally, embedded devices are generally built around a specialized hardware component, which is the "reason to exist" for these devices (like the camera in the above example). Other typical components include: a processor, RAM and ROM memory, a storage medium, a display, one or more communication devices, and power and over-voltage protection components.

In most embedded systems, some type of file system is needed. Generally, flash memory is used for data storage. In one embodiment, the embedded device may use two file systems: Compressed RAM (CRAMFS) to store files that do NOT change (and using as little flash space as possible), and JFFS (Journaled Flash File System) for changing data files.

The JFFS is a file system designed for safe use with flash devices. It typically minimizes flash block erases and reduces flash damage.

Embedded systems also generally necessitate some set of system tools. For example, in one embodiment, utilities such as init, ifconfig, mount, and sh, may be provided in a very small memory footprint (ram and flash). One example of such a tool set is provided by a product called BusyBox. BusyBox is a program that replaces a set of UNIX utilities with smaller versions. It is specially designed for embedded usage, i.e., for applications where a small memory footprint is more important than a full set of functionality. It can be configured to include just the needed tools.

Various embodiments of the devices described below with reference to FIGS. 4A-4C may be suitable for use as embedded devices. In particular, in various embodiments, the devices 110 described below may be used to store and run a graphical program execution engine for executing graphical programs received from the host computer 102.

Figure 4A:
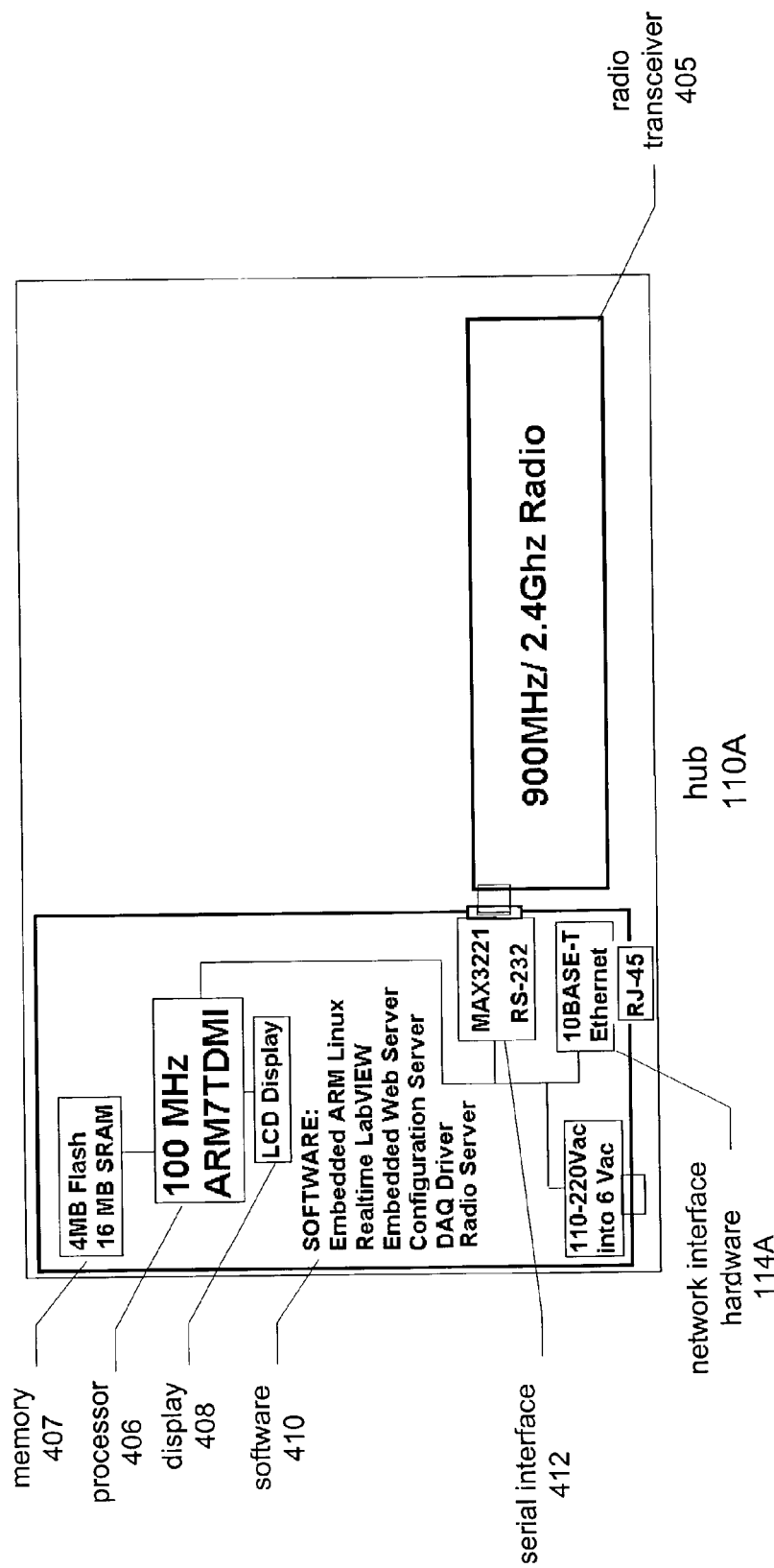
FIGS. 4A and 4B are block diagrams of embodiments of the hub device of FIGS. 1A, 1B, and 2.
Figure 4B:
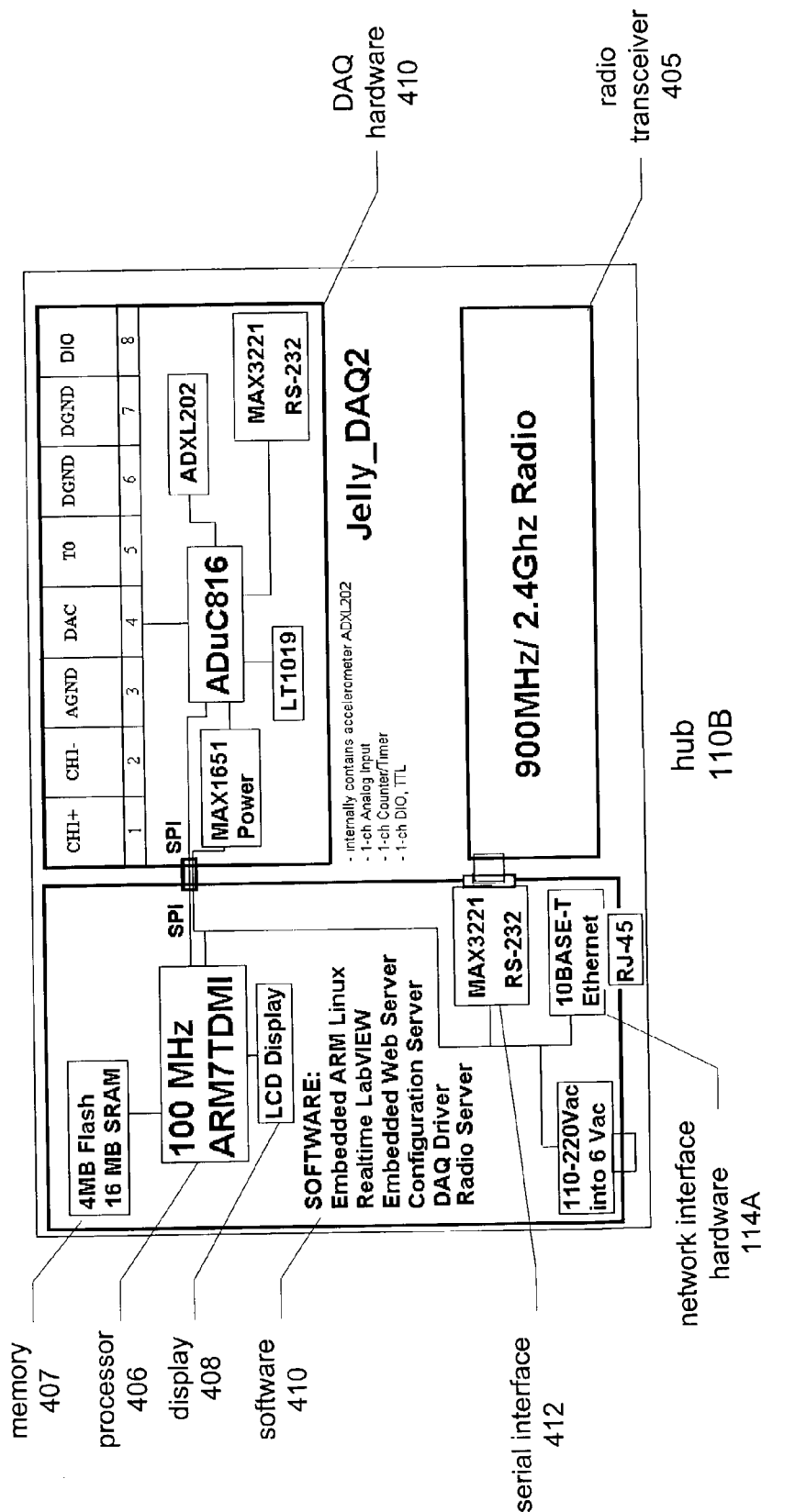

FIGS. 4A and 4B—Hub Device with Wireless Communication Means

FIGS. 4A and 4B illustrate two embodiments of the hub device of FIGS. 1A, 1B, and 2. In each of these embodiments, the hub 110 includes a radio transceiver 405 for wireless communication with one or more wireless sensors or DAQ devices 120.

In the embodiment shown in FIG. 4A, the hub device 110A may include a 900 MHz/2.4 GHz radio 405 for communicating with the wireless sensors or DAQ devices 120. The radio 405 may couple through a serial interface 412 to network interface hardware 114A and to a processor 406 and memory 407. In this particular embodiment, the radio 405 couples through a MAX3221/RS-232 serial interface 412 to a 10Base-T Ethernet interface with an RJ-45 connector to facilitate communication with the host computer system 102. The processor 406 may be a 100 MHz ARM7TDMI processor which uses 4 MB flash and 16 MB SRAM for storage. For example, the hub device 110A may store a number of software programs 410 to implement various portions of the methods described herein, including, for example, a real-time OS, e.g., embedded ARM Linux; a real-time graphical program execution engine, such as LabVIEW RT; an embedded web server, e.g., for publishing data over the network 104; a configuration server, for configuring the hub device 110, and optionally, the sensors 120; an optional DAQ driver, for operating a DAQ device; and a radio server, for managing communications using the radio transceiver 405. Additionally, the processor 406 may couple to a display 408, e.g., an LCD display which may be used to read configuration or status information for the device 110.

The embodiment of the hub device shown in FIG. 4B is similar to that shown in FIG. 4A, but with the addition of DAQ hardware 410. In other words, the hub device 110B includes the radio transceiver 405, processor 406, memory 407, serial interface 412, and network interface 114A, but also includes an on-board sensor 410 for performing data acquisition. Thus, in the embodiment shown in FIG. 4B, the hub device 110B may be operable to acquire data itself, as well as communicate with one or more wireless sensors 120.

FIG. 4C—Controller

Figure 4C:
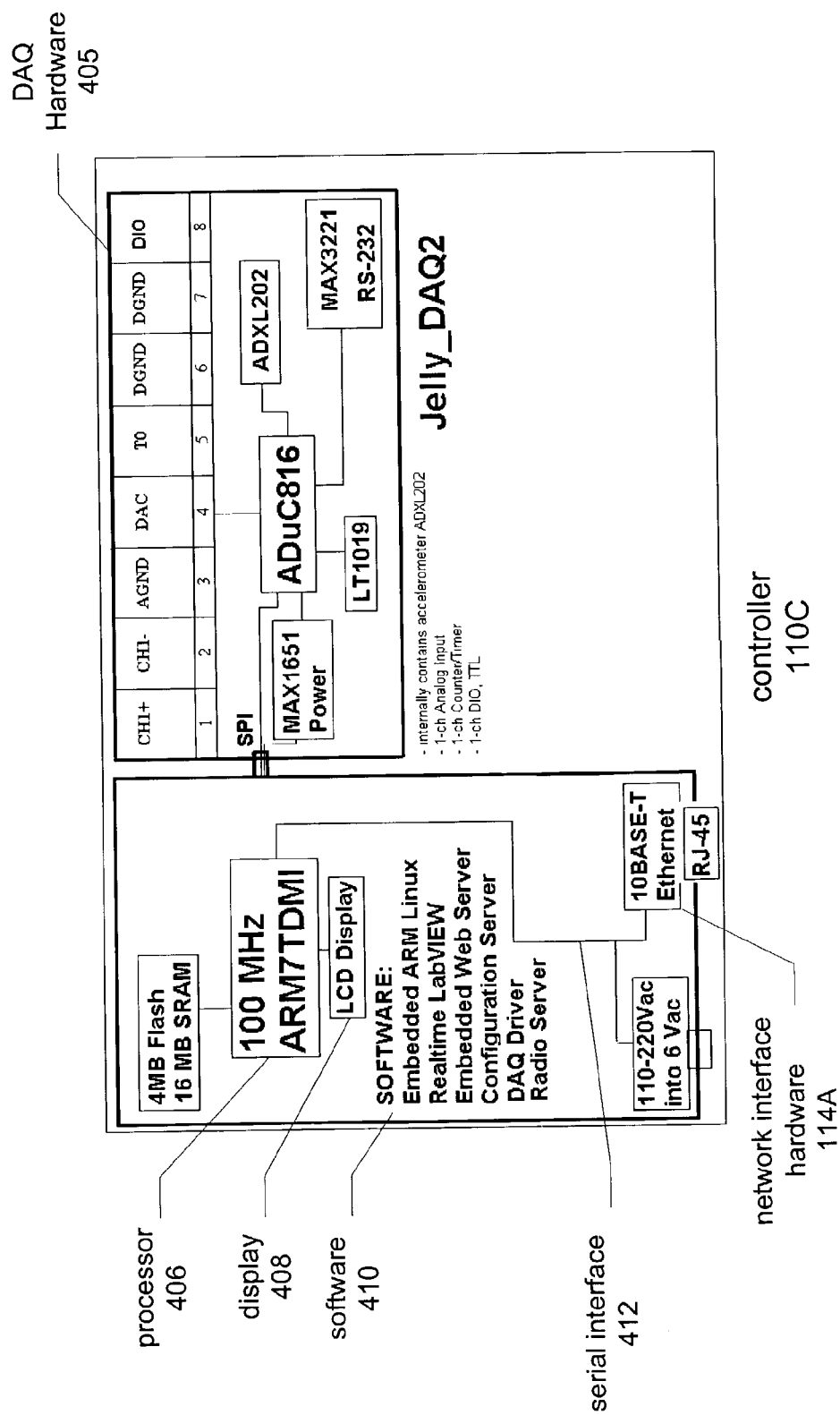
FIG. 4C is a block diagram of a controller device, according to one embodiment.

FIG. 4C is a block diagram of a device 110C which is similar to those shown in FIGS. 4A and 4B. However, rather than performing a hub function for communication with wireless sensors, the device 110C primarily functions as a data acquisition device. More specifically, the device 110C does not include the radio transceiver 405 for communicating with wireless sensors 120, but rather includes the sensor or DAQ device 410 on-board (as does hub device 110B). Thus, the device 110C functions as a controller, collecting data via DAQ hardware 410, and transmitting the data to the host computer system 102, e.g., over the Internet 104.

Figure 5A:
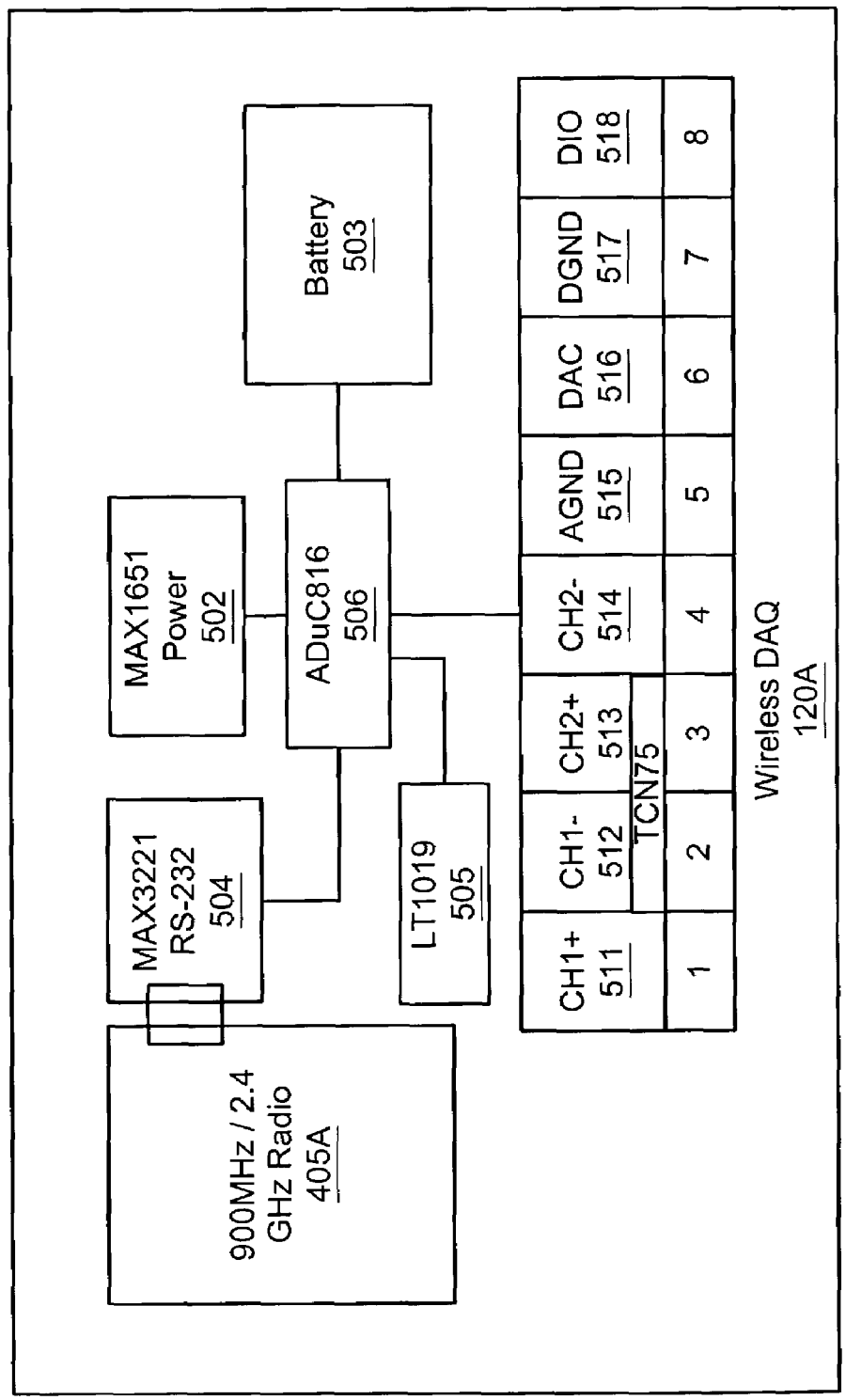
FIGS. 5A and 5B are block diagrams of two embodiments of a wireless DAQ device.
Figure 5B:
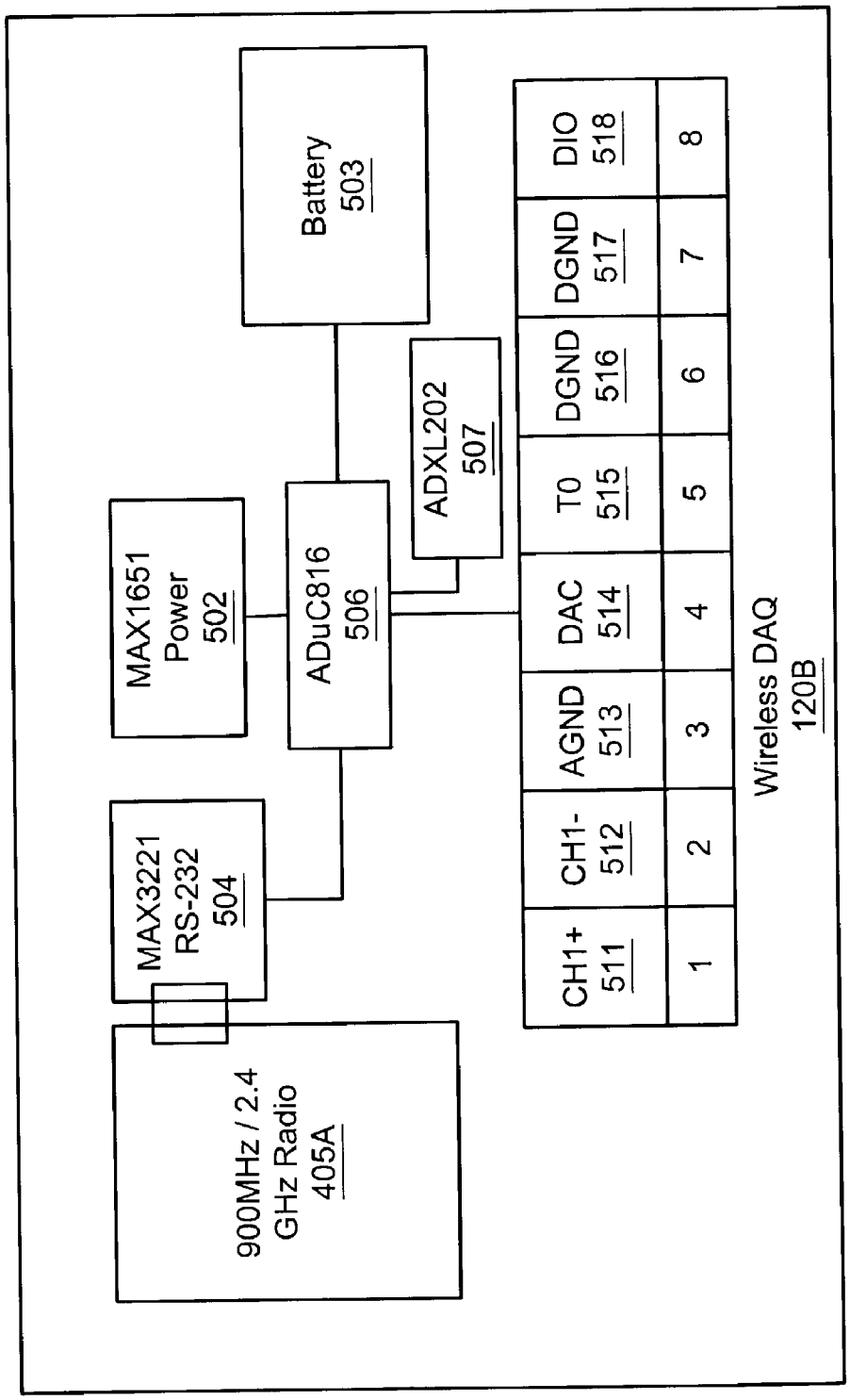

FIGS. 5A and 5B—DAQ Components

FIGS. 5A and 5B are block diagrams of exemplary wireless DAQ devices 120. It should be noted that the DAQ devices shown in FIGS. 5A and 5B are meant to be illustrative only, and are not intended to limit the invention to any particular DAQ device. As FIGS. 5A and 5B show, each DAQ device 120 includes a radio transceiver 405A, as described above, for wireless communication with the hub device 110. The radio transceiver 405 may couple to a smart transducer front end 506, such as, for example, an ADuC816 from Analog Devices, which integrates two high-resolution 16-bit sigma delta ADCs, an 8-bit MCU, and program/data Flash/EE Memory on a single chip.

This low power device, powered by battery 503, accepts low-level signals directly from a transducer. The two independent ADCs (Primary and Auxiliary) include a temperature sensor and a PGA (allowing direct measurement of low-level signals). The ADCs with on-chip digital filtering are intended for the measurement of wide dynamic range, low frequency signals, such as those in weigh scale, strain-gauge, pressure transducer, or temperature measurement applications. The ADC output data rates are programmable and the ADC output resolution will vary with the programmed gain and output rate. The device operates from a 32 kHz crystal with an on-chip PLL generating a high-frequency clock of 12.58 MHz. The micro controller core is an 8052 and therefore 8051-instruction-set-compatible. 8 Kbytes of nonvolatile Flash/EE program memory are provided on-chip. 640 bytes of nonvolatile Flash/EE data memory and 256 bytes RAM are also integrated on-chip. The ADuC824 also incorporates additional analog functionality with a 12-bit DAC, current sources, power supply monitor, and a band gap reference. On-chip digital peripherals include a watchdog timer, time interval counter, three timers/counters, and three serial I/O ports (SPI, UART, and I 2 C-compatible). On-chip factory firmware supports in-circuit serial download and debug modes (via UART), as well as single-pin emulation mode via the EA pin. The part operates from a single 3.3 V supply. When operating from 3 V supplies, the power dissipation for the part is below 10 mW. The device 120 may communicate with single board computers, e.g., the ARM processor 406 of the hub/controller device 110 either via SPI interface, as in FIGS. 4B and 4C, or via RS-232 and radio interface, as in FIGS. 4A and 4B.

As FIGS. 5A and 5B also show, the DAQ devices 120 may include a number of ports 1-8 (511-518) which may provide various functions such as channels, analog and digital grounds, digital/analog conversion, and digital I/O, among others.

Figure 6:
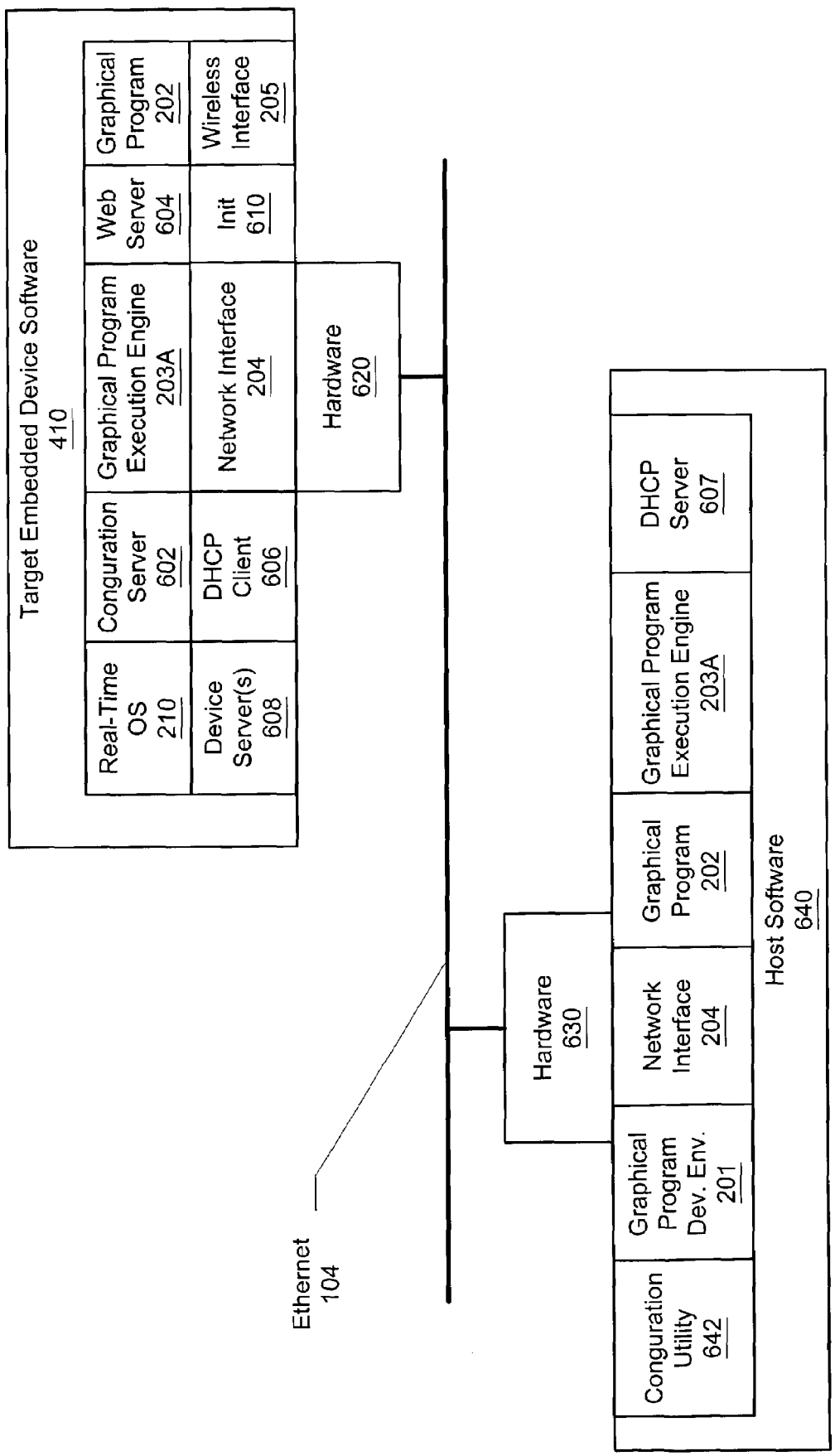
FIG. 6 illustrates host and target device software for the systems of FIGS. 1A, 1B, and 2, according to one embodiment.

FIG. 6—Host and Target Device Software

FIG. 6 illustrates the host computer system software and the target device (hub/controller) software, according to one embodiment. As FIG. 6 shows, in one embodiment, in addition to the software described above with reference to FIG. 2, i.e., the graphical program development environment 201, execution engine 203, graphical program 202, and network interface 204, the host computer system 102 may also include DHCP server software 607 and a configuration utility 642. Similarly, in addition to the execution engine 203A, graphical program 202, real-time OS 210, wireless interface 205, and network interface 204, the target embedded device 110 (hub/controller) may also include DHCP client software 606, web server software 604, one or more device servers 608, an initialization program 610, and a configuration server 602.

The host computer system 102 may include the DHCP server software 607 to facilitate network setup by the target device 110, as described below, and may also include the configuration utility 642 to allow a user to easily configure the target device 110, and optionally, any connected DAQ devices 120.

In one embodiment, the additional target device software may provide the following functionality:

Init 610—a process specific to the System V UNIX operating systems. Its role is to bring up systems, restart services that need to be restarted, and manage orphaned children (as described in UNIX manuals).

DHCP client 606—the second started process. The target device 110, as described above, is connected to a network 104, and so the DHCP client 606 tries to contact DHCP server 607 and configure the networked device 110 as told. In one embodiment, the target device 110 may be configured by default to automatically setup its network. In an embodiment where the target device is configured with a fixed IP address, then the DHCP client program may not be required. If the DHCP client is unable reach a DHCP server, e.g., within an interval of 30 seconds, then a static default network configuration may be loaded.

Configuration server 602—runs continuously on the target device 110, interacting with configuration utilities running on the host computer 102 to allow the user to configure the target device 110. The configuration server 602 interacts with the device server(s) 608, managing data communication between the target device 110 and the host computer 102.

Device servers 608—e.g., DAQ and wireless servers, are permanently active drivers, implementing communication with local DAQ devices that are attached to the mother board of the target device 110 via SPI or serial interface. These drivers may talk to the configuration server 602 and the execution engine 203A (e.g., LabVIEW RT) using a local pipes system. Examples of device servers 608 are provided below.

Web server 604—runs permanently, serving web pages upon request from the host computer 102. For example, the target device 110 may continuously execute a web server that hosts the target device web application. In one embodiment, the web server software used is thttpd, a small but very fast and capable web server designed for maximum performance and a low memory footprint. Its main qualities are:
  Simple: It handles only the minimum necessary to implement HTTP/1.1. Well, maybe a little more than the minimum.
  Small: It also has a very small run-time size, since it does not fork and is very careful about memory allocation.
  Portable: It compiles cleanly on most Unix-like OSs, e.g., FreeBSD, SunOS 4, Solaris 2, BSD/OS, Linux, OSF.
  Fast: In typical use about as fast as the best full-featured servers (Apache, NCSA, Netscape). Under extreme loads it may be much faster.
  Secure: It goes to great lengths to protect the web server machine against attacks and break-ins from other sites.

Execution engine 203A—e.g., LabVIEW Realtime (LVRT) runs continuously, waiting for connections and executing the loaded VIs. For example, LVRT runs in a memory and CPU load jail. This prevents LVRT from consuming the entire CPU power and system memory, allowing other processes to have a fair chance of doing their job, regardless of the VI that is running in parallel.

Additionally, an optional shell program may be include for debug and wait for command on COM0 purposes. The shell program may be disabled prior to delivery to a user.

Many different device server 608 are contemplated for use in various embodiments of the present invention. For example, device servers 608 may support hardware capabilities for such example DAQ devices 120 as:
  DAQ device 1
  2 AI
  1 AO
  1 External Temp Ref
  1 DIO
  1 Power Management
  DAQ device 2
  1 Accelerometer
  1 AI
  1 AO
  1 Counter/Timer
  1 DIO
  1 Power Management
  DAQ device 3
  2 RTD
  1 DIO
  1 Power Management
  DAQ device 4
  4 Relay Drive
  1 DIO
  1 Power Management
  DAQ device 5
  1 AI
  4 DIO
  1 Power Management In various embodiments, the following functions may be supported (among others):
  1. Analog Input
    AI_Read (SlaveID, channelID, polarity, range, rate, value)
    Calibrate(SlaveID, channelID, calibration type)
    Test (SlaveID, channelID, test type, transducer detected)
  2. Analog Output
    AO_Write (SlaveID, channelID, voltage)
  3. Digital Input/Output
    DIG_Read (SlaveID, channelID, state)
    DIG_Write (SlaveID, channelID, value)
  4. External Temperature Reference
    ETS_Read (SlaveID, channelID, value)
  5. Accelerometer
    ACC_Read (SlaveID, channelID, value1, value2)
  6. RTD
    RTD_Read (SlaveID, channelID, value)
  7. Counter/Timer
    CTR_Start (SlaveID, channelID)
    CTR_Read (SlaveID, channeled, value)
  8. Relay
    DIG_Write (SlaveID, channelID, value)
  9. Power Management
    Power_Read (SlaveID, channelID, value)

Figure 7:
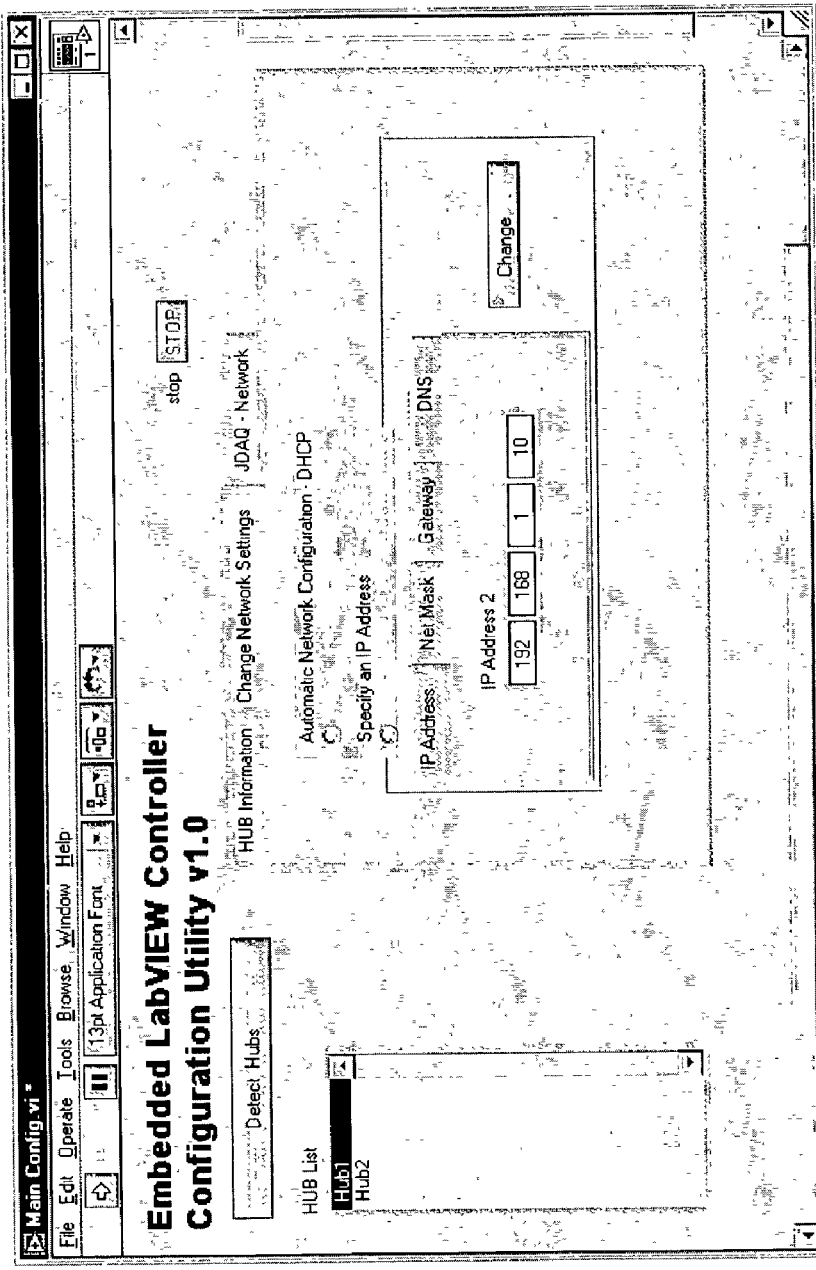
FIG. 7 illustrates a configuration utility interface, according to one embodiment.

FIG. 7—Configuration Utility

FIG. 7 illustrates one embodiment of the configuration utility 642. As FIG. 7 shows, the configuration utility 642 may provide means for setting and/or modifying the network configuration for the various components of the system, e.g., target devices 110 and DAQ devices 120, as well as for detection of networked hub devices 110 and/or DAQ devices 120. It is noted that the configuration utility interface, as shown in FIG. 7, is preferably displayed on a display device of the host computer system.

In one embodiment, the configuration server 602 implements a configuration service running on the target device 110. This service may pass data between a program running on the Host computer, e.g., the configuration utility 642, and device servers 608 running on the target device 110. In some embodiments, the graphical program execution engine, e.g., LabVIEW RT may be capable of talking directly to the device servers 608, and so may not need to use the services of the configuration server 602. In one embodiment, communication with the configuration server 602 may be performed using UDP protocol commands on UDP port 43567. In general, there may be three ways to communicate with the configuration server 602:

1) Through a target device 110 user interface (e.g., a 4×16 char LCD display and four buttons).

2) By executing the configuration utility 642 on the host computer 102 (e.g., from inside LabVIEW or as an executable) that then detects and configures target devices 110 over the network. This is the most frequent situation. There are cases when it is not possible to detect target devices 110 over the network, for example, when there is no operable DHCP server present. The configuration utility may provide ways to manually configure the target devices 110 in this scenario.

3) From inside a web browser, by accessing the configuration page of the target device 110. This method generally works once the target device 110 is configured, and may be used to change different configuration parameters.

In one embodiment, the configuration server 602 may start running at target device boot-up. It may assume an active role during the system boot sequence, passing the target device configuration to the device drivers. After boot-up, the configuration server 602 may run in background, waiting for commands (either from the network 104 or from the local user interface). The configuration utility program 642 and the web server 604 may be allowed to send commands to configuration server 602. For example, in one embodiment, a UDP based protocol may be defined for this communication, i.e., for communication between device servers, LabVIEw Realtime, and the configuration utility.

In one embodiment, the following services may be available in the protocol:

Discovery service—Detection of target devices 110 may be performed using special broadcast UDP packets. The discovery packet is the only valid UDP broadcast packet. When a discovery request is received a reply UDP packet may be sent.

Request device current configuration—Once the discovery phase is completed, all other information exchange between the Host and the target may be performed by using UDP requests and replays to unicast (normal) IP addresses.

Change device network configuration—configuration fields such as: serial number of target device 110, UIDP port, mask, ELC's MAC address, IP address, Netmask, and Gateway information may be modified.

Read and change device name—read the name and change the name of a particular target device 110.

Thus, in one embodiment, the configuration utility 642 may reside on the host computer system 102, and communicate with the configuration server 602 on the target device 110. The configuration utility 642 may provide the following services:

1. detection via DHCP server of all ELC's connected to the network;

2. manual target device configuration (IP address, mask, etc);

3. change of network configuration;

4. detection of DAQ devices (local via SPI interface and remote via radio interface); and 5. configuration of DAQ devices that are attached to the target device 110.

Thus, the configuration utility executable may allow detection and configuration of the target devices 110 on the network, as well as their respective DAQ devices 120. It should be noted that in one embodiment, the embedded system may be monitored by using a web browser or by programming the target devices 110 by using DHCP or TCP/IP calls from inside the programming environment.

Figure 8:
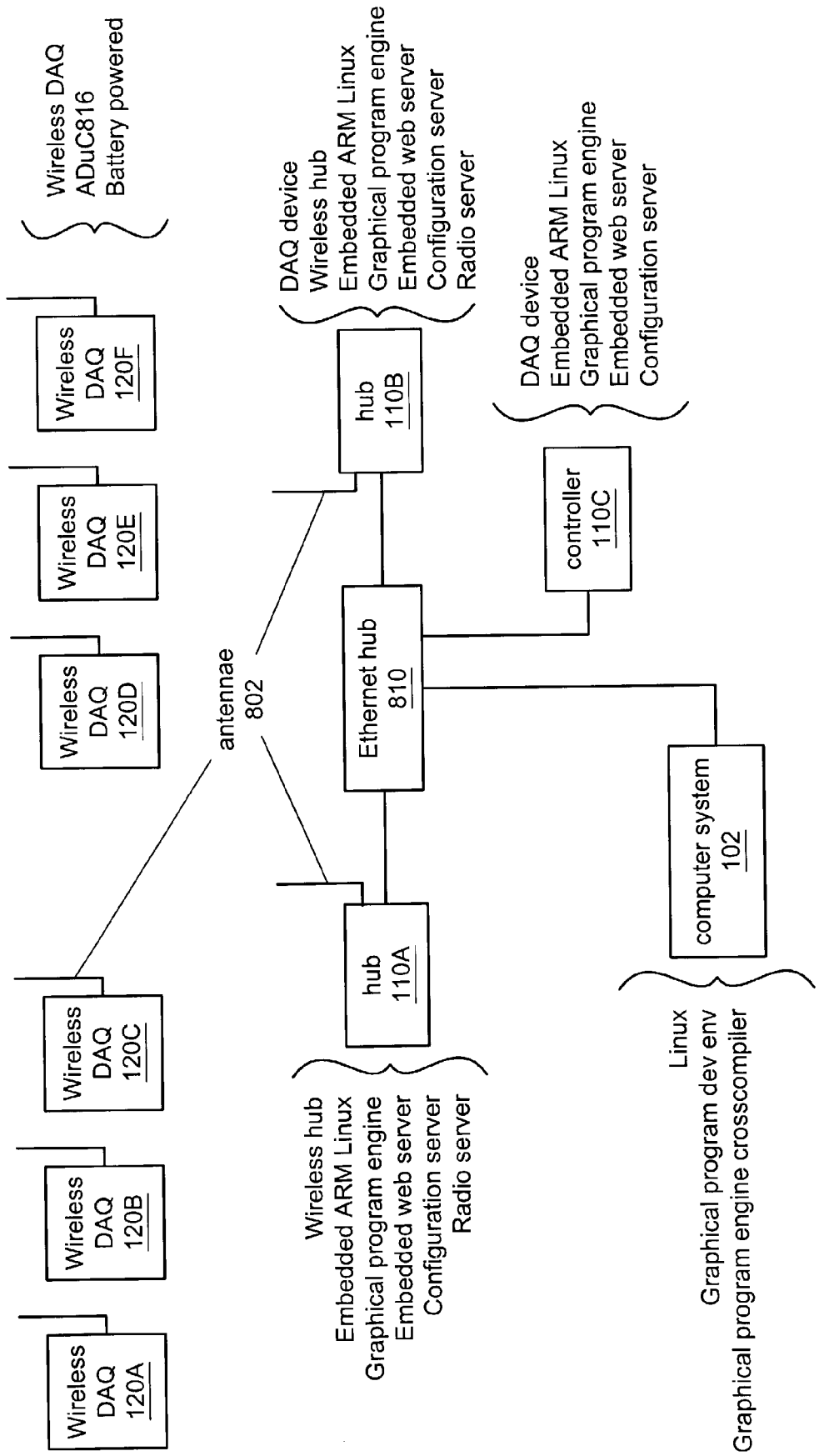
FIG. 8 illustrates an extended data acquisition system, according to one embodiment.

FIG. 8—Extended DAQ System

FIG. 8 is a block diagram of one embodiment of an extended DAQ system, according to the present invention. In the example DAQ system of FIG. 8, the computer system 102 is coupled to an Ethernet hub 810 to allow operation of multiple target devices 110 with respective DAQ devices 120. In particular, in the embodiment shown, the Ethernet hub 810 couples the computer system 102 to target devices 110 representing the three embodiments of FIGS. 4A, 4B, and 4C, respectively. It is noted that the Ethernet hub 810 is not the target device hub shown in FIGS. 1A, 1B, 2, 4A and 4B, but rather is a simple Ethernet hub whose sole functionality is to provide additional network connections for the host computer system 102.

As FIG. 8 shows, the Ethernet hub 810 may couple to hub 110A, which communicates wirelessly to wireless DAQ devices (sensors) 120A-120C via antennae 802. Note that in this embodiment, hub 110A includes wireless hub functionality, and is loaded with embedded ARM Linux, the graphical program execution engine, an embedded web server, a configuration server, and a radio server.

In one embodiment, the radio server may be a driver used to access wireless (radio enabled) measurements points. For example, the radio server may be operable to discover remote DAQ devices that enter and exit a radio network (centered around a target device 110), and to interrogate remote DAQ devices for data at user request. The radio server may communicate with programs running locally on the target device 110 by using named pipes as a data exchange mechanism.

As FIG. 8 also shows, the Ethernet hub 810 may couple to hub 110B, which communicates wirelessly to wireless DAQ devices (sensors) 120D-120F via antennae 802. Note that in this embodiment, hub 110B includes an on-board DAQ device, in addition to the wireless hub functionality, embedded ARM Linux, the graphical program execution engine, embedded web server, configuration server, and radio server, described below.

Finally, the Ethernet hub 810 may couple to controller 110C, which, as described above with reference to FIG. 4C, includes a DAQ device, but does not provide wireless functionality. As shown, in this embodiment, the controller 110C includes embedded ARM Linux, the graphical program execution engine, the embedded web server, and the configuration server.

Thus, in this embodiment, the DAQ system may include a plurality of hubs and/or controllers, each of which may acquire data from one or more sensors or DAQ devices, and send the data to the host computer system 102 for storage, analysis, and/or transmission to other systems.

Figure 9:
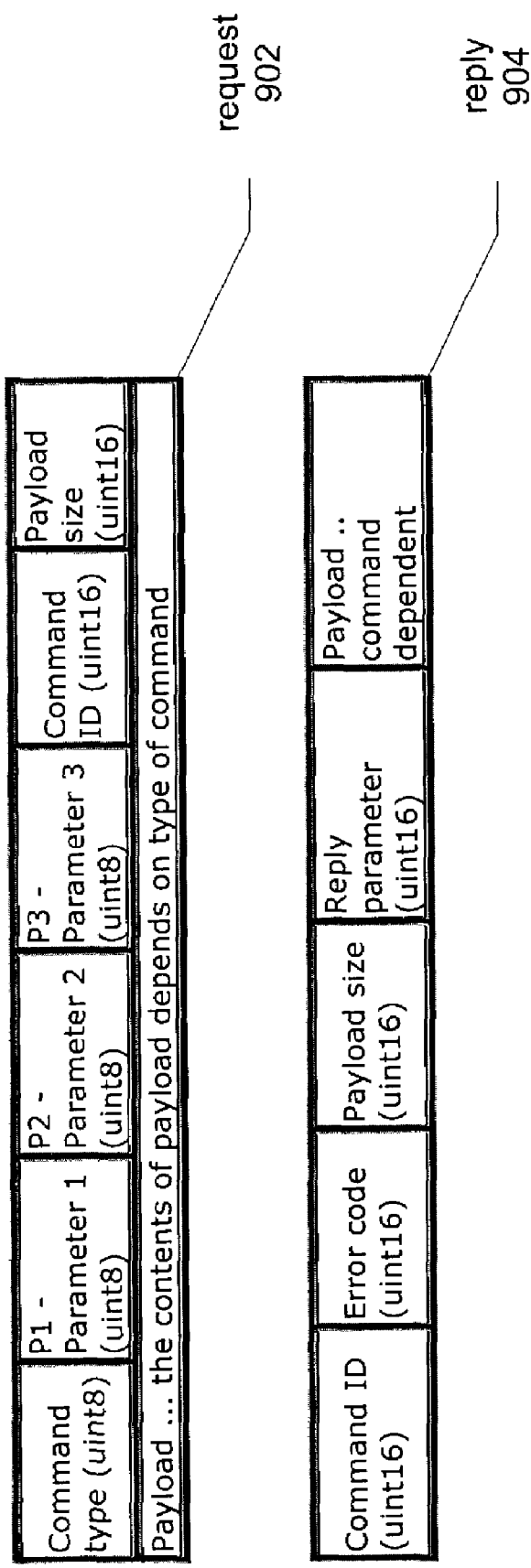
FIG. 9 illustrates request and reply formats for communications with wireless DAQ devices, according to one embodiment.

FIG. 9—Formats for Requests and Replies

FIG. 9 illustrates one embodiment of a format for requests and replies, such as may be used for inter-process communications using named pipes in Linux. As is well known in the art, named pipes are special files that act like FIFOs in the following way: one program opens the file for write and other program opens the same file for read. The reader receives what the writer sends. The transfer operation is guaranteed to be atomic when the amount of transferred data is less than 4 kbytes.

As FIG. 9 shows, in one embodiment, a request 902 may include a command type, various parameters (P1, P2, and P3), a command ID, a payload size, and the payload, the contents of which may depend upon the type of command. Examples of commands are provided below. As FIG. 9 also shows, in one embodiment, a reply 904 may include a command ID, an error code, a payload size, a reply parameter, and a command-dependent payload.

Example commands may include one or more of:

1. Retrieve the list of active DAQ devices 120. This command may be used to browse the DAQ device network.
   Request:
   Command type: 1
   P1, P2, P3: not used
   Command ID: used to keep track of request/replies
   Payload size: should be 0
   Payload: not used
   Reply:
   Command ID: Should be the same with Command ID from request
   Error code: 1 means "no error". Any other value signals that an error occurred during command processing. See error codes table at the end of the document for details.
   Reply parameter: not used
   Payload size: represent the amount of data returned, and is equal with the number of active devices multiplied by 2
   Payload: contains an array (uint16[]) with addresses of active devices. The number of active devices is equal with payload size divided by 2

2. Read the target device name and type. Interrogate a target device and read its name.
   Request:
   Command type: 2
   P1: address of device
   P2, P3: not used
   Command ID: used to keep track of request/replies
   Payload size: should be 0
   Payload: not used
   Reply:
   Command ID: Should be the same with Command ID from request
   Error code: 1 means "no error". Any other value signals that an error occurred during command processing. See error codes table at the end of the document for details.
   Reply parameter: type of the device.
   Payload size: represents the amount of data returned, and is equal with the length of device name
   Payload: contains the device name 3. Change the target device name. Interrogate a target device and change its name.
   Request:
   Command type: 3
   P1: address of device
   P2, P3: not used
   Command ID: used to keep track of request/replies
   Payload size: the size of the new name
   Payload: new name stored here
   Reply:
   Command ID: Should be the same with Command ID from request
   Error code: 1 means "no error". Any other value signals that an error occurred during command processing. See error codes table at the end of the document for details.
   Reply parameter: not used
   Payload size: represents the amount of data returned, and is equal with the length of device name
   Payload: contains the current device name. It is the same with the requested name, in the case o an error it will be unchanged 4. Read a value from a DAQ device.
   Request:
   Command type: 4
   P1: address of device
   P2: the channel to read
   P3: not used
   Command ID: used to keep track of request/replies
   Payload size: not used
   Payload: not used
   Reply:
   Command ID: Should be the same with Command ID from request
   Error code: 1 means "no error". Any other value signals that an error occurred during command processing. See error codes table at the end of the document for details.
   Reply parameter: not used
   Payload size: represents the amount of data returned
   Payload: contains the value read from channel. Its type depends on channel type 5. Write a value to a DAQ device.
   Request:
   Command type: 5
   P1: address of device
   P2: the channel to write
   P3: not used
   Command ID: used to keep track of request/replies
   Payload size: not used
   Payload: not used
   Reply:
   Command ID: Should be the same with Command ID from request
   Error code: 1 means "no error". Any other value signals that an error occurred during command processing. See error codes table at the end of the document for details.
   Reply parameter: not used
   Payload size: not used
   Payload: not used FIG. 10A—Wireless DAQ Device Software Architecture FIG. 10A illustrates one embodiment of a software architecture 1002 for a wireless DAQ device 120. In one embodiment, the wireless DAQ devices 120 include an 8051 core micro-controller with 8 kb of program memory, and a 900 MHz radio. In this embodiment, the software which executes on this hardware includes a manager program for the wireless DAQ 1012, as shown in FIG. 10A, which may manage the operation of three other software components, namely, an acquisition level 1014, a radio level 1016, and an alarm level 1018.

In one embodiment, the radio level implements the transmission/reception of radio packets, described below with reference to FIG. 10B. The acquisition level implements data acquisition, conversion and transfer to radio level. Finally, the alarm level may activate when special situations such as loss of power, or alarm levels occur. These special situations are treated by sending an alarm message via the radio level to the target device 110 for user notification.

Communication between the three levels may be performed by using a common communication buffer. This may be possible because in one embodiment, the DAQ devices 120 can either talk or listen, but not both in the same time. Data resulting from the ADC conversion by the DAQ devices may be deposited directly into this common communication buffer.

In one embodiment, a piconet architecture of master-slave type may be implemented. For example, the Master (a target device 110) may initiate and control communication with the DAQ devices 120. With the exception of the alarm packets, everything going from DAQ devices 120 to the Master target device 110 is the result of a request from the target device 110, and so the target device generally initiates communication exchanges. As mentioned above, in one embodiment, radio communication may be implemented by using 900 MHz radios, e.g., the 9Xstream radio transceiver, available from MaxStream. Some desirable features of these radio transceivers may include all or part of:

1. Frequency Hopping Spread Spectrum (FHSS) technology
2. Resistant to noise and interference.
3. Up to ¼ mile effective range (25 miles with high gain antenna, line of sight)
4. Multi-drop (broadcast) networking protocol
5. Easy to integrate. No knowledge of RF required. Interfaces to any micro-controller
6. Small size
7. Exceptional data transfer performance
8. Received packets are analyzed for data corruption using proprietary technology
9. FCC approved, no licensing or further approval necessary.

The Radio Level

In one embodiment, the radio level may be divided in two sub-levels, as follows:

MAC (Medium Access Control) access—contains the set of functions that communicate with this particular radio transceiver (9Xstream from MaxStream). In one embodiment, MAC access control functions may include:

1. Generation of Start/Stop bytes at transmission and detection of these bytes at reception time;
2. Elimination of special bytes (Start, Stop, Escape) from a packet at reception time, and generation of Escape sequences at transmission time;
3. Recognize the address at reception time, ignore packets that are not sent to the receiver; and
4. Verification of the control sum in the header of the received packets.

FIGS. 10B and 10C—Radio Communication Packet Structure

FIGS. 10B and 10C illustrate an exemplary radio packet structure for use by the radio transceivers 405 on-board the hub 110 and DAQ devices 120. FIG. 10B illustrates the packet structure, and FIG. 10C provides the meanings and size of the various fields of the packet. This particular packet structure is used by the MaxStream 9Xstream transceivers mentioned above. It should be noted that in other embodiments of the invention, other radios and/or other radio packet structures may be used as desired.

As FIG. 10B shows, in this embodiment, the radio packet may begin with a Start byte 1022. The Start byte 1022 is a single reserved byte that marks the beginning of a packet. A 2 byte destination address 1023 may then follow, indicating a destination device address (that receives the packet). After the destination address 1023, a 2 byte source address 1024 indicating an address of the sender device (that sends the packet) may follow.

Then, a 2 byte bitfield called Command & Channel 1025 may be included, where the bits include a Frag bit, indicating whether the packet is part of a larger fragment, a Seqn bit, indicating a sequence number, a 3 bit Command (read, write, error, etc.), and a 3 bit channel number.

After the Command & Channel bytes, a Checksum byte 1026 may be included as a control sum for the packet header. The Checksum may be used for error detection, as is well known in the art.

The packet may also include a payload 1027 which is the data sent or received. In this embodiment, the payload 1027 is limited to a maximum size of 64 bytes.

Finally, the packet may be terminated with a Stop byte 1028 that marks the end of the packet.

Radio Communication Control

Radio communication control is maintained by a set of functions that implement packet reception/transmission. The radio level may determine the "Command" field from inside a communication packet. For example, the following commands may be defined:

Channel access commands
PKT_READ—channel read
PKT_WRITE—channel write
Communication control
PKT_PING—packet that is sent to the Master to signal an active DAQ device 120
PKT_POLL—packet that is sent by the Master to find active DAQ devices 120
Special packets
PKT_ACK—reception acknowledgement
PKT_ERROR—error notification. The error code is located in the Payload section of the packet.
PKT_ALARM—alarm notification. The alarm code is located in the Payload section of the packet In one embodiment, detection of active DAQ devices 120 in the piconet may be performed by the radio server executing on the Master target device 110. The Master may send, at predefined time intervals, interrogation packets of type PKT_POLL. These may be broadcast type packets, and therefore may be received by all Slave devices that belong to the piconet. Slave devices that are active may answer the PKT_POLL message. An active device is a DAQ device that has been identified by the Master, that understands and receives PKT_READ and PKT_WRITE commands from the Master, and that understands and receives PKT_PING commands from the Master (to keep the Master awake in case there is no Read/Write request for a specified time period for that device)

Channel Read/Write

Access from radio communication to the DAQ driver functions (ex: AI_Read(), AO_Write(), etc) may be implemented by PKT_READ and PKT_WRITE. Channel and operation type information may be contained in the Command & Channel field of these functions. The DAQ device 120 that has been contacted by a PKT_READ call may answer by sending the acquired data. If contacted by a PKT_WRITE call, the DAQ device 120 may send a packet of type PKT_ACK to acknowledge that the write operation has been executed.

The radio server running on the target device 110 may re-send packets that have not been confirmed as received by slave DAQ devices 120. The number of re-transmissions may be limited, so if nothing happens after a certain number of successive re-transmissions, the target device 110 may consider that particular DAQ device in-active and it may delete the device from it list of active devices. An inactive DAQ device 120 may become active again by answering the target device 110 that sent PKT_POLL message.

The Alarm Level

PKT_ALARM type packets are reserved for detection of special situations, also called alarms, and may be sent by DAQ devices 120 to the Master target device 110 in case some predefined alarm situation occurs. The Master may confirm, via a PKT_ACK packet, that it received the alarm notification.

Figure 11A:
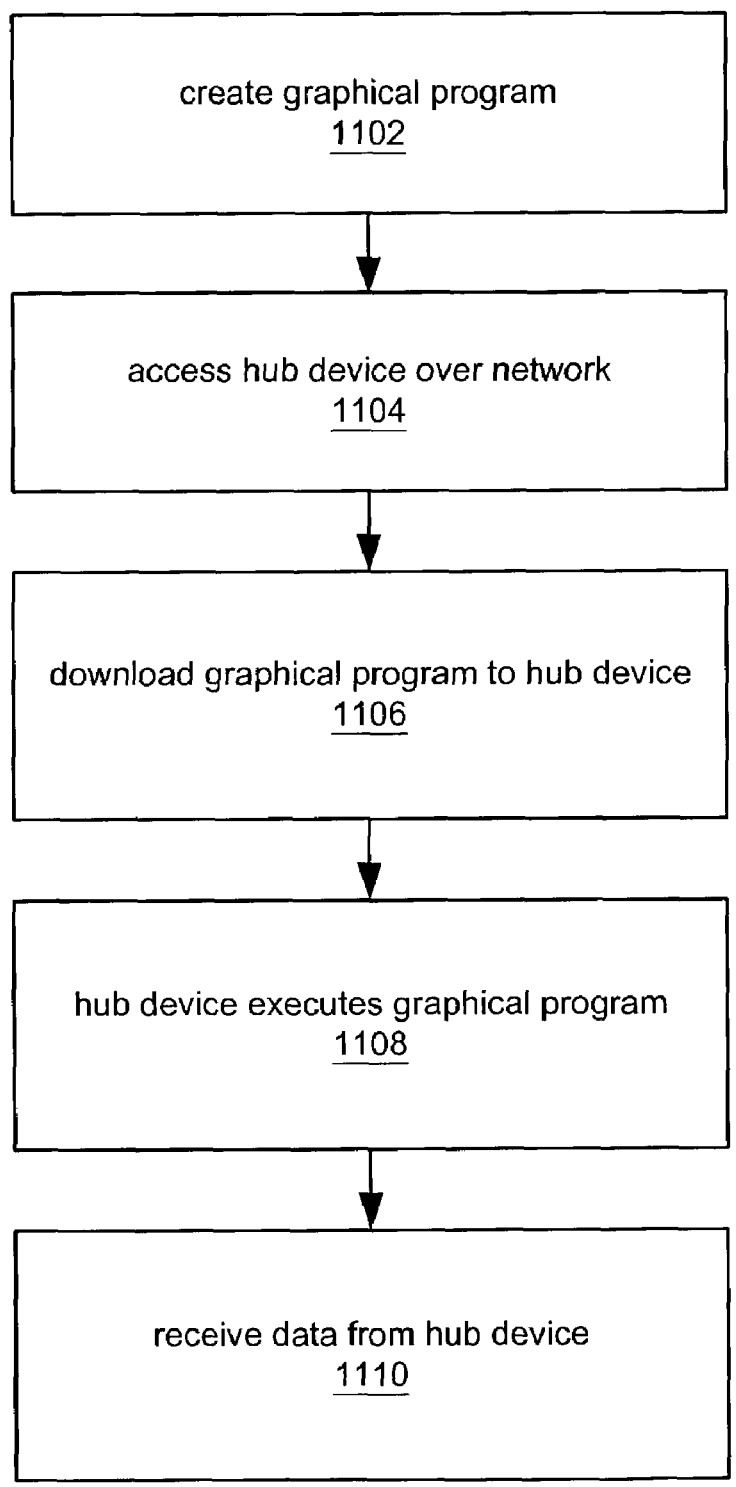
FIG. 11A is a flowchart diagram illustrating one embodiment of a method for executing a graphical program.

FIG. 11A—Method For Executing a Graphical Program

FIG. 11A illustrates one embodiment of a method for creating, deploying, and executing a graphical program to perform a function. More specifically, a method is described for creation and deployment of programs on the hub device 110 for performing data acquisition in the system of FIGS. 1A (and 1B). It is noted that in various embodiments, some of the steps may be performed in a different order than shown, or may be omitted. Additional steps may also be performed. As shown, this method may operate as follows. It is further noted that although the methods herein are described in terms of graphical programs, it should be noted that the techniques described are broadly applicable to any other types of program as well.

In one embodiment, the user first may create a program that is operable to execute within the hub device 110, as indicated in 1102. In creating the program, the user may be aware of the one or more sensor devices 120 which will be acquiring data in the system. The user may include code in the program which is operable to execute on the hub device 110, and which operates to provide instructions or commands to one or more of sensor devices 120 to direct the sensor devices 120 to acquire data at certain times or based on certain detected events.

In one embodiment, the user may create a graphical program (or block diagram) on computer system 102. As noted above, a graphical program may comprise graphical code, i.e., two or more interconnected nodes or icons which visually represent operation of the program. The nodes may be interconnected in one or more of a data flow, control flow, or execution flow format. The graphical program may be a LabVIEW program, a Simulink program, a VEE program, or other type of graphical program. In creating the program, the user may place icons within the graphical program representing each of the respective sensor devices 120 that are being used. The user may also include graphical code in the program which operates to provide instructions to the respective sensor device icons, e.g., by connecting other graphical nodes to the sensor device icons in the graphical program. Thus, the graphical program may be created or assembled by the user arranging on a display a plurality of nodes or icons and then interconnecting the nodes to create the graphical program. In response to the user assembling the graphical program, data structures (or code) may be created and stored which represent the graphical program.

As noted above, the graphical program may comprise a block diagram and may also include a user interface portion or front panel portion. Where the graphical program includes a user interface portion, the user may assemble the user interface on the display. As one example, the user may use the LabVIEW graphical programming development environment to create the graphical program. The user interface code may be designed to execute on the host computer 102, with the block diagram or graphical program designed to execute on the hub device 110.

In an alternate embodiment, the graphical program may be created in step 1102 by the user creating or specifying a prototype, followed by automatic or programmatic creation of the graphical program from the prototype. This functionality is described in U.S. patent application Ser. No. 09/587,6102 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, or a combination thereof, as desired. The graphical program may implement a measurement function that is desired to be performed by the DAQ device or instrument. For example, in an embodiment where the instrument is an image acquisition device (e.g., a smart camera), the graphical program may implement an image processing function.

Once the program has been completed, then in step 1104, the user may cause the computer system to send the program over network 104 (or other communication medium) to hub device 110. The hub device 110 may receive and execute the program. In executing the program received from the computer system, the hub device 110 may be directed by the program to provide certain commands to respective ones of sensor devices 120 to cause the sensor devices to acquire data and provide this acquired data to the hub device 110. Examples of the types of commands that may be implemented by sensor devices 120 include, but are not limited to, single/multiple point read, writes (e.g., for configuration) start, and stop, among others.

In one embodiment, the graphical program source code may be sent to the hub device 110. In another embodiment, the graphical program may be compiled (e.g., by software executing on the host computer 102) to object code (or other machine executable or interpretable code) which may then be sent to the hub device 110. In one embodiment, prior to sending the program to the hub device 110, the execution engine 203A may be deployed to the hub device 110. In another embodiment, the hub device 110 may already have the execution engine 203A installed. In another embodiment, the hub device 110 may not require a graphical program execution engine. For example, a user who creates a Simulink diagram may use the MathWorks Real Time Workshop product to convert the Simulink diagram into C code (or other text code), and then may compile the C code to machine language code for provision to the hub device 110. This machine language code may not require an execution engine, but rather may simply execute under an operating system.

Then, as shown in the flow chart of FIG. 11A, in step 1108 the hub device 110 executes the program received from the computer system, e.g., via the execution engine 203A. In one embodiment, the hub 110 may execute the program upon reception of the program from the host computer 102. In another embodiment, after the program has been transferred to the hub 110, the user may send a command to the hub over the network 104 invoking execution of the program by the hub 110.

As noted above, in one embodiment, the program deployed to the hub device may comprise a hardware configuration program, e.g., for configuring an FPGA on the hub device to perform the measurement function, i.e., to send commands to the measurement device to perform the function. In other words, the program, e.g., the graphical program, may be compiled or converted to a hardware configuration program, then deployed onto the FPGA on the hub device. Alternatively, the hardware configuration program may be transmitted to the hub device, and the hub device may then wirelessly deploy the hardware configuration program onto an FPGA of the measurement device.

In an exemplary embodiment, the execution of the program results in some data being acquired. As described above, in response to program execution on the hub device 110, the one or more sensors 120 may acquire data and provide this acquired data to the hub 110. This data may then be sent (e.g., over the network 104 or other communication medium) to the host computer system 102. In one embodiment, the host computer 102 may execute GUI code to present a GUI on its display. The data received from the hub device 110 (or received directly from the one or more sensors 120) may be displayed in this GUI on the host computer 102. In this manner, the system may operate in a similar manner to LabVIEW RT, as described in U.S. Pat. No. 6,173,438.

In other embodiments, the acquired data may be sent to other systems. For example, in one embodiment, the hub device 110 may use web server program 604 to publish the acquired data to a website, where a system with a web browser may then access the data. In another embodiment, the hub device 110 may execute web server program 604 to essentially act as a website. In another embodiment, the hub may send the data to one or more other systems coupled to the network 104 (e.g., the Internet). Thus, the hub may send the acquired data to any networked devices, as desired. Further details of the program execution are described below with reference to FIG. 11B.

Various operations may be performed in response to the acquired data. For example, the host computer 102, or another computer, may perform analysis on the data. This analysis may lead to a certain operation, such as notification of excessive levels of a certain substance (e.g., pollution), changes in a manufacturing plant, changes in a process control facility, etc.

Figure 11B:
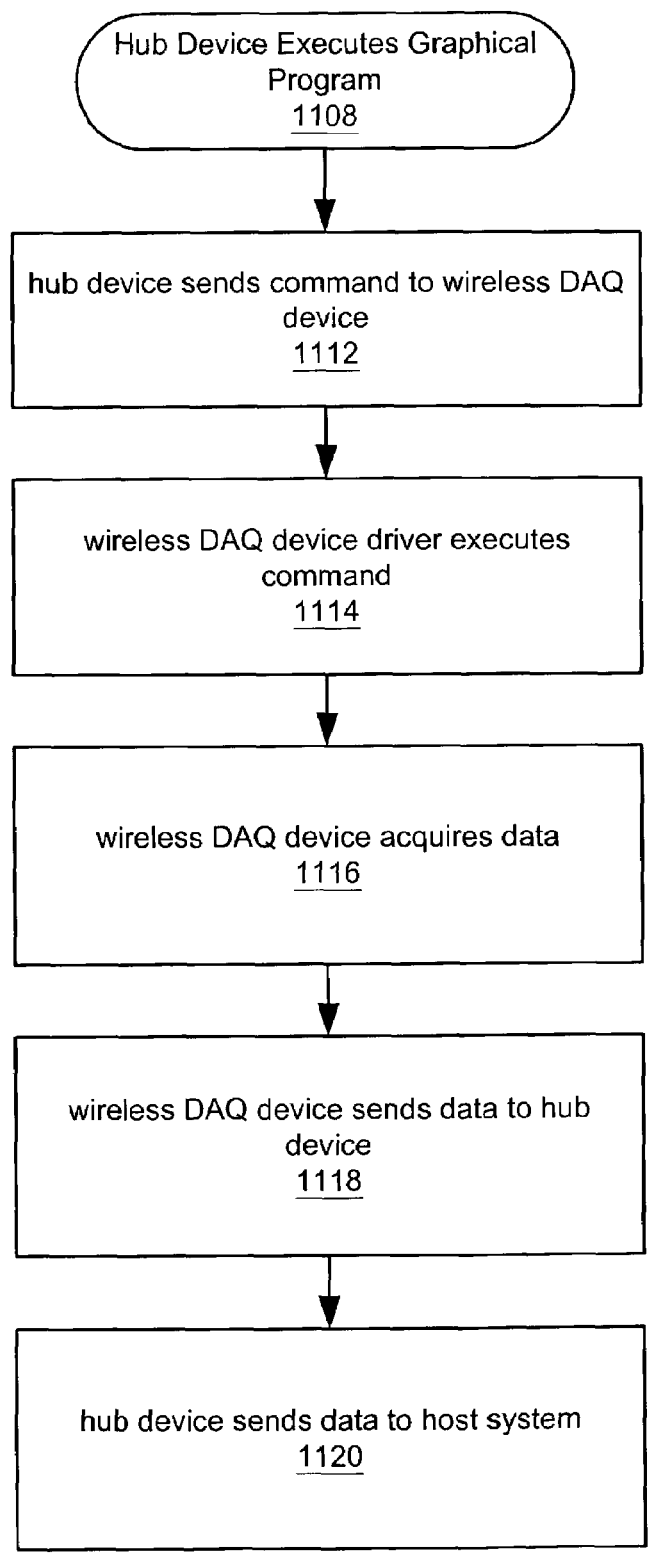
FIG. 11B is a flowchart diagram illustrating one embodiment of a method for executing a graphical program using a wireless DAQ device.

FIG. 11B—Execution of the Graphical Program

FIG. 11B flowcharts a more detailed embodiment of the graphical program execution of step 1108 above. As noted above, in various embodiments, some of the steps may be performed in a different order than shown, or may be omitted. Additional steps may also be performed.

In the embodiment of FIG. 11B, the hub device 110 executing the graphical program may include the hub device 110 providing one or more commands to a respective wireless smart sensor or DAQ device 120, as indicated by 1112 (or multiple different smart sensors). In other words, execution of the program 202 may cause the hub device 110 to provide a command to the respective sensor device 120 via wireless means. The command is preferably one that is recognized by the driver software 220 on the sensor device 120.

In step 1114, the respective wireless DAQ device driver 220 may execute the command. For example, the driver 220 may execute to cause the wireless sensor 120 to perform a single point read. Then, in 1116, the wireless DAQ device may acquire data from an external phenomenon, e.g., may perform the single point read. It should be noted that other commands may also be sent to the wireless DAQ device in addition to read commands, as mentioned above, such as, for example, start, stop, parameter writes, etc. In other words, the execution of the program by the hub device 110 may result in a variety of commands being sent to the wireless sensor 120 to perform a corresponding variety of functions, or to perform a complex function which required multiple commands to be executed by the sensor 120.

After the DAQ device 120 has acquired the data, then in 1118, the DAQ device 120 may send the data to the hub device 110, e.g., through wireless means, such as over the network 104. In other words, the sensor device 120 may provide the acquired data in a wireless fashion to hub device 110. The hub 110 may then send the data to the host computer system 102, as indicated in 1120. The host computer system 102 may display the received data in a GUI, and/or may otherwise process the received data to generate a certain result. In one embodiment, the user constructs a GUI or front panel as part of the process of creating the graphical program, and this GUI code is executed on the computer system 102 to present the GUI on the display of the computer system 102.

In one embodiment, once the hub 110 has received the data, the hub device 110 may then execute the program to analyze the acquired data to generate a certain result, e.g., a Boolean result such as a pass-fail or yes-no. For example, sensor device 120 may be acquiring data from the atmosphere proximate to the sensor to determine the presence of one or more substances, e.g., such as bacterial toxins in a food process plant. The sensor may provide the acquired data to the hub device, and the hub device executing the program may operate to analyze the data to generate a Boolean value (yes or no), indicating whether any of the substances of interest are present. The hub device may then possibly provide this result to computer system 102.

In an alternate embodiment, the hub device 110 simply receives the acquired data from a sensor device and provides the acquired data over the network to the computer system. In this embodiment, the computer system 102 may perform analysis on the data to determine a result from the data. In other words, computer system 102 may analyze the acquired data to determine if any interesting substance is present and then may generate or store an indication of this result, e.g., either by storing the value in memory, generating information on a graphical user interface on the display device to a user, indicating an alarm, providing an email to store the information to a third party, or other processing as a result of this analysis.

As mentioned above, in other embodiments, the hub 110 may, in addition to, or instead of, sending the data (or results based on the data) to the host computer 102, send the data to another system on the network 104, or publish the data to a website.

In one embodiment, prior to sending and/or executing the program, the user may use the configuration utility to determine and/or modify the status of the hub 110 and/or the wireless DAQ devices 120. For example, the user may issue a command through the configuration utility 642 to perform a discover process, whereby available resources, e.g., hubs 110 and/or available wireless DAQ devices 120 for particular hubs, may be discovered. The discovered resources may be displayed by the configuration utility 642. The user may then configure one or more of the resources as desired to facilitate performance of the data acquisition task implemented by the program 202.

Figure 12A:
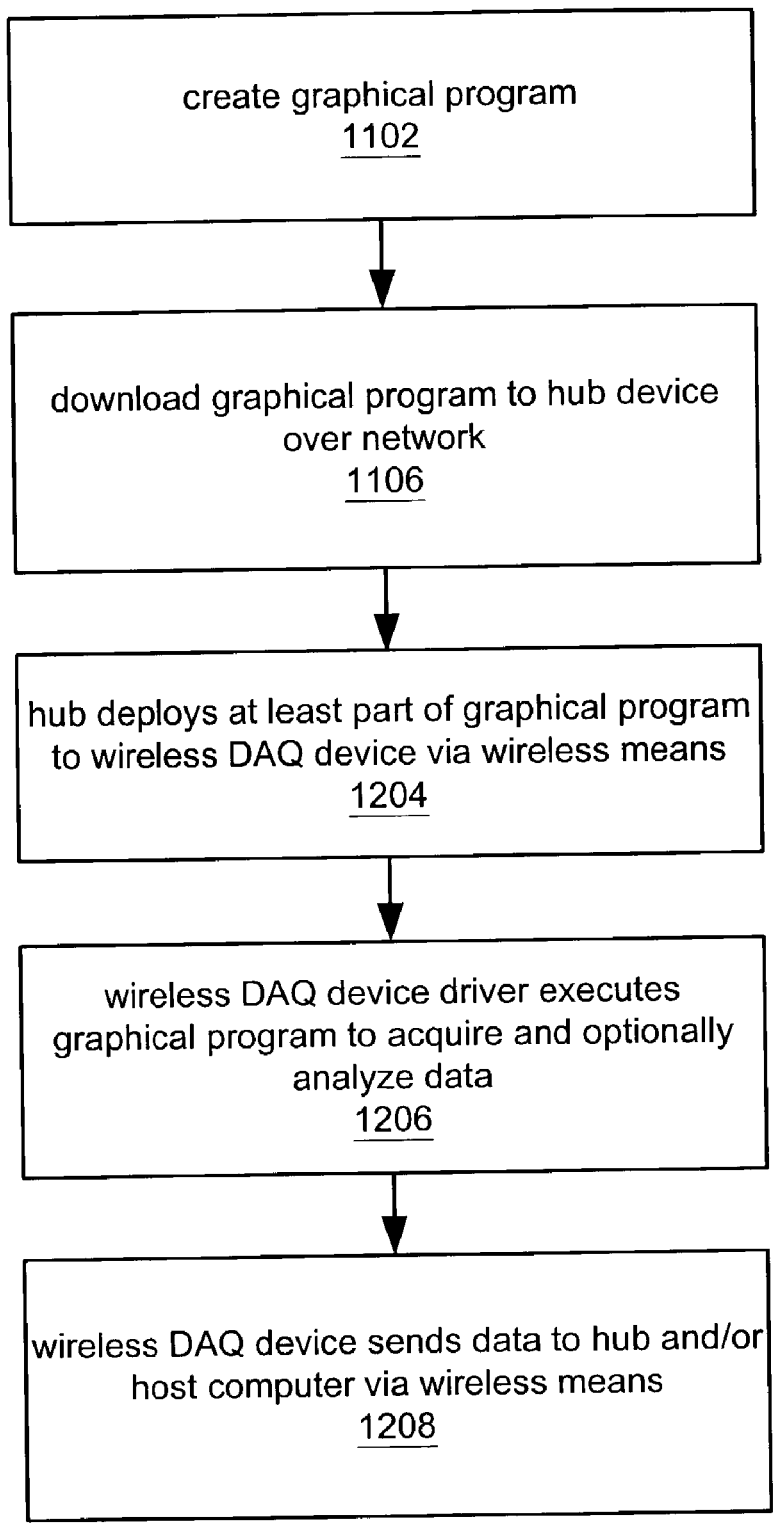
FIGS. 12A and 12B flowchart embodiments of a method for deploying a graphical program to a wireless DAQ device for execution by the DAQ device.

FIG. 12A—Alternative Method for Executing a Graphical Program

In another embodiment, as shown in FIG. 12A, the sensor device 120 includes a processor and memory medium for executing programs deployed from the hub device 110. In this method, operation is similar to FIG. 11A, except that the hub 110 deploys at least a portion or possibly all of the received program from computer system 102 onto sensor device 120 (or multiple sensor devices 120) for execution. In other words, after the graphical program is created in 1102, in 1106 the host computer 102 downloads the program to the hub 110 over the network 104. Then, in 1204 the hub 110 deploys at least a portion of the program to the wireless sensor 120 via wireless means.

The sensor device 120 may then execute the program to acquire data and may optionally analyze the acquired data to generate a result, as indicated in 1206. Thus, if the sensor is acquiring data to detect the presence of a substance or the occurrence of a condition, the sensor may acquire the data, immediately perform processing on the acquired data, and generate a result such as a Boolean yes-no value. Then, in 1208, the wireless DAQ device 120 may send the data (or results based on the data) to the hub and/or the host computer via wireless means. In one embodiment, the sensor may produce a signal or trigger to generate an indication to a user as to the result, e.g., by sounding an alarm, beeping a beeper, flashing a light, or other mechanism to alert a user that, e.g., the substance or condition has been detected.

Figure 12B:
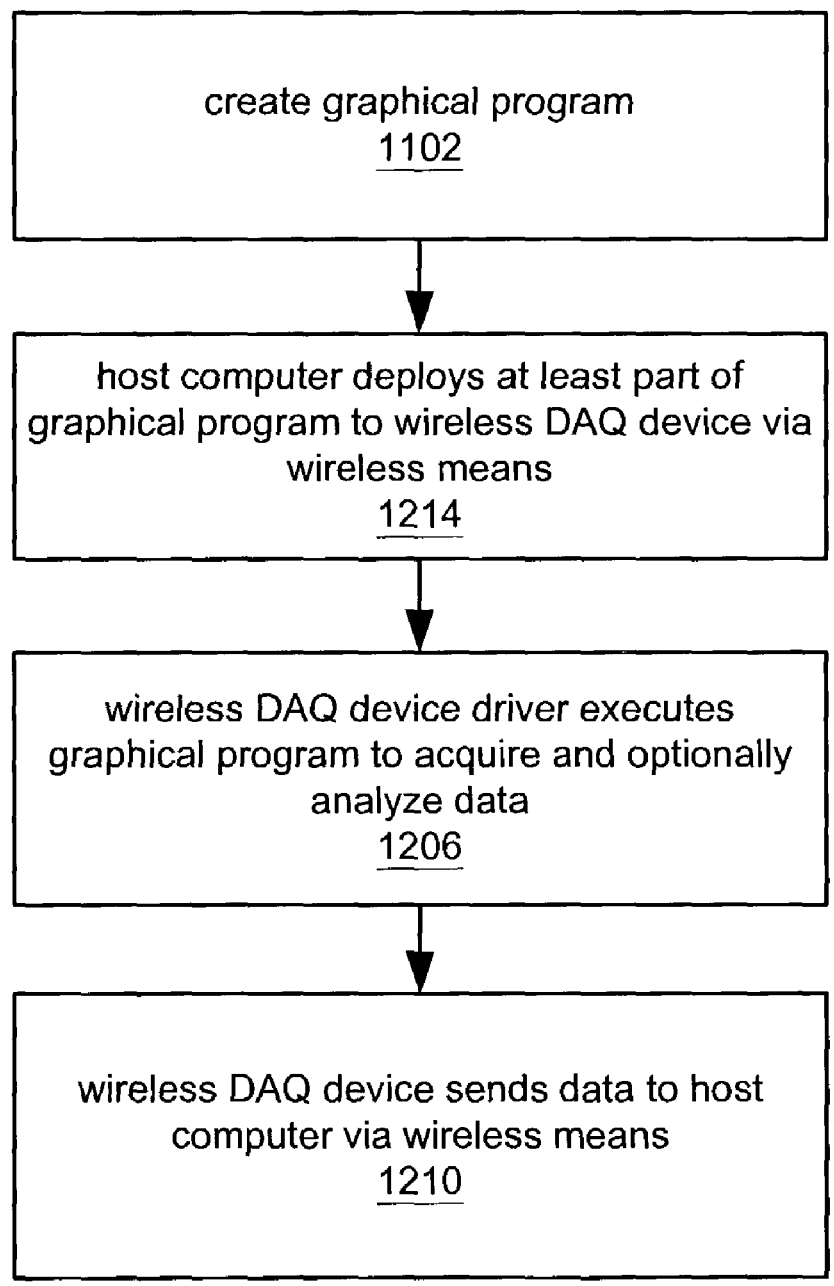

FIG. 12B—Alternative Method for Executing a Graphical Program

FIG. 12B is a flowchart of yet another embodiment of a method for executing a graphical program. In the embodiment of FIG. 12B, the host computer system 102 communicates directly with the one or more wireless DAQ devices 120. This method corresponds to an embodiment of the system illustrated in FIG. 1C, described above, where the hub device 110 is omitted. As mentioned above, in other embodiments, various of the steps presented may be performed in a different order than shown, or may be omitted. Additional steps may also be performed as desired.

As FIG. 12B shows, once the program is created in 1102, then the host computer 102 may deploy at least a portion of the graphical program to the wireless DAQ device 120 via wireless means, e.g., via radio, satellite, or cell towers, among others. The wireless DAQ device 120 may then execute the graphical program to acquire and optionally analyze the data, as indicated in 1206, and described above.

Finally, in 1210 the wireless DAQ device 120 may send the data or results based on the data to the host computer via wireless means.

In one embodiment of the invention, the program that is created on the computer system 102 may require use of a program execution engine 203 to execute the program. For example, in one embodiment, the program is a graphical program and requires graphical program execution engine 203 to execute the program. Due to the small footprint of target device, e.g., hub device 110 and/or smart sensor 120, in one embodiment, the program execution engine is configured in such a way so as to only transmit the minimum amount of a program execution engine actually required by the program that is being executed. Thus, in one embodiment, the program execution engine is partitioned into a (minimal) base execution engine, and a plurality of components for presenting different functionality that can be performed by a program. The base portion of the program execution engine is only capable of executing the very simplest commands. This minimal engine may comprise the smallest set of commands which allows the other components to be executed.

In one embodiment, when the program is developed by the user, a software program executing on the computer may operate to analyze the program to determine the functionality contained in the program. Once the functionality of the program has been identified, the program uses the functionality to determine which of the respective components of the program execution engine are actually required by the program. In one embodiment, the method determines the functionality of the program, and uses the functionality to index into a data structure or look-up table to determine which program execution engine components will be required to execute this program. When the program is then transmitted or deployed to hub device 110, the computer system may operate to only provide the program execution engine base portion and the respective components that are actually required to execute the program. Thus, the smaller amount of execution engine code may be transmitted to the hub device. This allows a smaller footprint for one or more of the target devices and/or the sensor devices. In other words, target device 110 and sensor device 120 may include a smaller processor and/or a smaller memory medium since a full program execution engine is not required to be transmitted.

In one embodiment, after the software program analyzes the program to determine the functionality contained in the program, an execution engine analysis program may determine which execution engine components are required for execution of the program. A deployment program may then assemble the required components of the execution engine and the program, for example, by interspersing the required execution engine components and the program together according to the order of execution of the program. These interspersed program execution engine components and program may then be assembled into a file, and respective portions of the file transmitted to the target device, e.g., the hub device 110 and/or sensor device 120, for execution.

In one embodiment, successive portions of the file may be streamed to the hub device 110 and/or sensor device 120 for dynamic execution. In other words, the target device may execute the program as it is streamed to the device. For example, the sensor device 120 may receive a first portion of the file comprising a first portion of a program to be executed at a first portion of the execution engine components that are used for executing this first portion of the program. After this first portion of the program has been executed along with the first portion of the execution engine components, the first portion of the program may be flushed or removed from the memory of the sensor device. In a similar manner, the execution engine components that are no longer required may be also removed from the memory. However, execution engine components that may be required by other portions of the program to be executed may be retained in the memory for execution. As discussed above, in one embodiment, the deployment program determines which execution engine components may be required for a plurality of different portions of the program, and includes a variable or data structure or other indication with the execution engine component to indicate that this component should not be flushed immediately after it has been executed, or others should be retained by hub device 110 and/or sensor device 120 for execution with another part of the program.

After the first portion of each of the program execution components and the program has been executed, computer system 102 and/or hub device 110 may then provide a second portion of the program interspersed with the second portion of the execution engine components. The second portion of the file may be provided by the computer system to hub device 110 and/or may be provided by hub device 110 to sensor device 120. Operation then proceeds as above. Thus, for example, computer system 102 may operate to provide respective portions of the deployment file to hub device 110 for execution on an as needed basis, based on the memory availability or memory capacity of hub device 110. Hub device 110 may receive the program that it is supposed to execute along with the execution engine components used by that portion of the program, execute the program under direction of the execution engine components, and then receive further portions of the deployment file, and so forth. Thus, computer system 102 may essentially provide a stream of the program and its corresponding execution engine components to the hub device according to the order of execution of the program.

In a similar manner, if the program is actually to be executed on the sensor device, computer system 102 may provide respective portions of this deployment file to hub device 110, and hub device 110 may stream the respective portions of the deployment file to a respective sensor device 120 on an as needed basis, based on the memory capacity of sensor device 120. For further information regarding the componentization of the execution engine and streaming execution of the graphical program, please see U.S. Provisional Patent Application Ser. No. 60/393,528, titled "Wireless Deployment/Distributed Execution of Graphical Programs to Smart Sensors", filed Jul. 3, 2002, which was incorporated by reference above.

In an example application of the present system, the hub device 110 operates to execute a radio server program which is operable to discover remote or wireless data acquisition devices that enter into and exit from the wireless communication space that is within the range of the hub device. Thus, periodically, the radio server executing on the hub device may send out a wireless communication signal to query the presence of respective data acquisition devices 120 that are within the wireless communication range of hub device 110. Any present data acquisition devices 120 may respond to the queries to indicate its respective presence. The queries may be performed periodically, e.g., once permitted, once per hour, once per day, or at greater or lesser time frame granularities.

Thus, various embodiments of the present invention may provide means for performing a measurement function by deploying or executing a graphical program to a measurement device using wireless means.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for performing a measurement function, the method comprising:
    storing a graphical program in a memory, wherein the graphical program comprises a block diagram portion and a user interface portion, wherein the block diagram portion comprises a plurality of interconnected nodes that visually indicate functionality of the graphical program;
    transmitting at least a portion of the graphical program to a hub device over a network, wherein the hub device comprises an embedded device;
    the hub device executing the at least a portion of the graphical program, wherein said executing comprises executing at least a portion of the block diagram portion, wherein the hub device does not execute the user interface portion;
    the hub device sending one or more commands to a smart sensor via wireless means in accordance with a wireless communication protocol in response to said executing;
    the smart sensor performing the measurement function in response to said one or more commands, thereby generating resultant data; and
    the hub device receiving and storing the resultant data from the smart sensor via wireless means.

2. The method of claim 1, further comprising:
    creating the graphical program, wherein the graphical program implements the measurement function.

3. The method of claim 2, wherein said creating the graphical program comprises:
    arranging the plurality of nodes on a display; and
    interconnecting the plurality of nodes in response to user input.

4. The method of claim 1,
    wherein the graphical program comprises a graphical data flow program.

5. The method of claim 1,
    wherein the graphical program is operable to perform one or more of:
        an industrial automation function;
        a process control function; and
        a test and measurement function.

6. The method of claim 1,
    wherein said performing the measurement function includes the smart sensor measuring a physical phenomenon to acquire data.

7. The method of claim 1,
    wherein, during execution of the graphical program, the user interface is displayed on a display of a first computer system and the block diagram executes on the hub device.

8. The method of claim 1, further comprising:
    receiving the resultant data from the hub device.

9. The method of claim 1,
    wherein said transmitting at least a portion of a graphical program to a hub device over a network comprises:
        generating a machine-executable program based on the at least a portion of a graphical program; and
        transmitting the machine-executable program to the hub device; and
    wherein said hub device executing the at least a portion of the graphical program comprises:
        the hub device executing the machine-executable program.

10. The method of claim 1,
    wherein said transmitting the at least a portion of the graphical program to the hub device over the network comprises transmitting at least a portion of the block diagram portion to the hub device;
    wherein said transmitting the at least a portion of the graphical program to the hub device over the network does not transmit the user interface portion to the hub device.

11. The method of claim 1, further comprising
    the hub device sending one or more commands to each of one or more additional smart sensors via wireless means in accordance with the wireless communication protocol in response to said executing;
    each of the plurality of smart sensors performing the measurement function in response to said one or more commands, thereby generating resultant data; and the hub device receiving and storing the resultant data from each of the one or more additional smart sensors via wireless means.

12. The system of claim 11, wherein the smart sensor comprises:
   a sensor; and
   a processing unit coupled to the sensor.

13. The system of claim 11, wherein the processing unit of the smart sensor comprises one or more of:
   a processor and memory; and/or
   a programmable hardware element.

14. A computer-implemented method performing a measurement function, the method comprising:
   creating a graphical program, wherein the graphical program implements the measurement function;
   storing the graphical program in a memory of a host computer, wherein the graphical program comprises a block diagram portion and a user interface portion, wherein the block diagram portion comprises a plurality of interconnected nodes that visually indicate functionality of the graphical program;
   transmitting the graphical program from the host computer to a hub device over a network, wherein the hub device comprises an embedded device;
   the hub device executing the block diagram portion of the graphical program, thereby sending one or more commands to a wireless smart sensor device via wireless means, wherein the hub device does not execute the user interface portion;
   the wireless smart sensor device performing the measurement function in response to the one or more commands, thereby generating resultant data;
   the hub device receiving and storing the resultant data from the wireless smart sensor device;
   the hub device sending the resultant data to the host computer; and
   the host computer executing the user interface portion of the graphical program to display the resultant data.

15. The computer-implemented method of claim 14, wherein the block diagram portion comprises a first portion implementing the measurement function, and a second portion implementing an analysis function, the method further comprising:
   the hub device executing the second portion of the block diagram portion of the graphical program to analyze the resultant data, thereby generating analysis results; and
   the hub device sending the analysis results to the host computer.

16. The method of claim 14,
   wherein the smart sensor comprises an embedded device, including a built-in sensor, wherein the built-in sensor is operable to measure physical phenomena.

17. A computer-implemented method for executing a graphical program, the method comprising:
   creating the graphical program;
   storing the graphical program in a memory of a host computer, wherein the graphical program comprises a block diagram portion and a user interface portion, wherein the block diagram portion comprises a plurality of interconnected nodes that visually indicate functionality of the graphical program;
   accessing a hub device over a network, wherein the hub device comprises an embedded device;
   downloading the graphical program from the host computer to the hub device over the network;
   the hub device executing the graphical program, wherein said executing comprises executing at least a portion of the block diagram portion, wherein the hub device does not execute the user interface portion, wherein said executing the graphical program further comprises:
      sending one or more commands to a plurality of distributed wireless smart sensor devices via wireless means;
      each of the wireless smart sensor devices executing the one or more commands to generate data; and
      each of the plurality of the wireless smart sensor devices sending the data to the hub device; and
   the host computer receiving, storing, and displaying the data from the hub device, wherein said displaying is performed by the user interface portion of the graphical program.

18. The method of claim 17,
   wherein each smart sensor device comprises an embedded device, including a built-in sensor, wherein the built-in sensor is operable to measure physical phenomena.

19. A system for executing graphical programs, the system comprising:
   a computer system which stores a graphical program in a memory, wherein the graphical program comprises a block diagram portion and a user interface portion, wherein the block diagram portion comprises a plurality of interconnected nodes that visually indicate functionality of the graphical program;
   an external hub device coupled to the computer system, wherein the external hub device comprises an embedded device; and
   at least one smart sensor device;
   wherein the external hub device is operable to communicate with the at least one smart sensor device in a wireless fashion;
   wherein the computer system is operable to provide the graphical program to the external hub device;
   wherein the external hub device is operable to:
      execute the graphical program, wherein said executing comprises executing at least a portion of the block diagram portion, wherein the hub device does not execute the user interface portion; and
      send commands to the at least one smart sensor device in a wireless fashion in accordance with said executing;
   wherein the at least one smart sensor device is operable to execute the commands to perform a function.

20. The system of claim 19, wherein the external hub device is coupled to the computer system over a network.

21. The system of claim 19,
   wherein the at least one smart sensor device is operable receive and execute the commands to acquire data from an external phenomenon; and
   wherein the at least one smart sensor device is operable to provide the acquired data to the external hub device in a wireless fashion.

22. The system of claim 21,
   wherein the external hub device is operable to analyze the acquired data.

23. The system of claim 21,
   wherein the external hub device is operable to provide the acquired data to the computer system; and
   wherein the computer system is operable to analyze the acquired data.

24. The system of claim 19, wherein, in executing the graphical program the external hub device is operable to execute a graphical program execution engine.

25. The system of claim 19,
wherein, in providing the graphical program to the external hub device, the computer system is operable to:
generate a machine-executable program based on the graphical program; and
communicate the machine-executable program to the hub device; and
wherein, in executing the graphical program, the external hub device is operable to:
execute the machine-executable program.

26. The system of claim 19,
wherein the smart sensor device comprises an embedded device, including a built-in sensor, wherein the built-in sensor is operable to measure physical phenomena.

27. A system for executing graphical programs, the system comprising:
a computer system which stores a graphical program in a memory, wherein the graphical program comprises a block diagram portion and a user interface portion, wherein the block diagram portion comprises a plurality of interconnected nodes that visually indicate functionality of the graphical program;
a hub device coupled to the computer system, wherein the hub device comprises an embedded device; and
one or more smart sensor devices;
wherein the hub device is operable to communicate with each of the one or more smart sensor devices in a wireless fashion;
wherein the computer system is operable to provide the graphical program to the hub device;
wherein the hub device is operable to execute the graphical program using a first smart sensor device of the one or more smart sensor devices in a wireless fashion, wherein said executing comprises executing at least a portion of the block diagram portion, wherein the hub device does not execute the user interface portion.

28. The system of claim 27,
wherein each of the one or more smart sensor devices comprises an embedded device, including a built-in sensor, wherein the built-in sensor is operable to measure physical phenomena.

29. A computer-implemented method for performing a measurement function, the method comprising:
creating a graphical program, wherein the graphical program implements the measurement function;
storing the graphical program in a memory, wherein the graphical program comprises a block diagram portion and a user interface portion, wherein the block diagram portion comprises a plurality of interconnected nodes that visually indicate functionality of the graphical program;
generating a machine-executable program based on the graphical program;
transmitting the machine-executable program to a hub device over a network, wherein the hub device comprises an embedded device;
the hub device executing the machine-executable program, wherein said executing comprises executing at least a portion of the block diagram portion, wherein the hub device does not execute the user interface portion;
the hub device sending one or more commands to a smart sensor via wireless means in accordance with a wireless communication protocol in response to said executing;
the smart sensor performing the measurement function in response to said one or more commands, thereby generating resultant data; and
the hub device receiving and storing the resultant data from the smart sensor via wireless means.

30. The method of claim 29,
wherein the smart sensor comprises an embedded device, including a built-in sensor, wherein the built-in sensor is operable to measure physical phenomena.

* * * * *